(12) United States Patent
Hasegawa et al.

(10) Patent No.: US 8,076,043 B2
(45) Date of Patent: Dec. 13, 2011

(54) FUEL CELL

(75) Inventors: Kenji Hasegawa, Hirakata (JP);
Toshiyuki Aoyama, Settsu (JP); Masaru Higashionji, Katano (JP); Masafumi Shimotashiro, Katano (JP); Masayuki Ono, Osaka (JP); Kenya Hori, Tsuyama (JP); Masaru Odagiri, Kawanishi (JP)

(73) Assignee: Panasonic Corporation, Osaka (JP)

( * ) Notice: Subject to any disclaimer, the term of this patent is extended or adjusted under 35 U.S.C. 154(b) by 251 days.

(21) Appl. No.: 12/333,786

(22) Filed: Dec. 12, 2008

(65) Prior Publication Data

US 2009/0092884 A1    Apr. 9, 2009

Related U.S. Application Data

(62) Division of application No. 10/868,778, filed on Jun. 17, 2004, now Pat. No. 7,479,342.

(30) Foreign Application Priority Data

Jun. 18, 2003  (JP) ................. 2003-173395
Jun. 18, 2003  (JP) ................. 2003-173409

(51) Int. Cl.
*H01M 8/04* (2006.01)
*H01M 8/22* (2006.01)
(52) U.S. Cl. ......... 429/512; 429/502; 429/514; 429/515
(58) Field of Classification Search .................. 429/502, 429/512–515
See application file for complete search history.

(56) References Cited

U.S. PATENT DOCUMENTS

| 4,629,664 | A | 12/1986 | Tsukui et al. |
|---|---|---|---|
| 4,988,583 | A | 1/1991 | Watkins et al. |
| 5,108,849 | A | 4/1992 | Watkins et al. |
| 5,599,638 | A | 2/1997 | Surampudi et al. |
| 5,773,162 | A | 6/1998 | Surampudi et al. |
| 6,099,983 | A | 8/2000 | Nakagaki et al. |
| 6,296,964 | B1 | 10/2001 | Ren et al. |
| 6,511,766 | B1 * | 1/2003 | Loutfy et al. ............ 429/454 |
| 6,632,553 | B2 | 10/2003 | Corey et al. |
| 6,660,419 | B1 | 12/2003 | Nishida et al. |
| 2002/0110718 | A1 | 8/2002 | Yang |
| 2002/0192530 | A1 | 12/2002 | Kabumoto et al. |
| 2004/0013928 | A1 * | 1/2004 | Yamauchi et al. ............ 429/34 |
| 2004/0062979 | A1 * | 4/2004 | Beckmann et al. ............ 429/38 |

FOREIGN PATENT DOCUMENTS

| JP | 58-165274 | 9/1983 |
|---|---|---|
| JP | 61-107666 | 5/1986 |
| JP | 63-45761 | 2/1988 |
| JP | 63-66860 | 3/1988 |
| JP | 63-76264 | 4/1988 |
| JP | 64-17379 | 1/1989 |

(Continued)

*Primary Examiner* — Karie O'Neill Apicella
(74) *Attorney, Agent, or Firm* — Wenderoth, Lind & Ponack, L.L.P.

(57) ABSTRACT

A fuel cell body has an anode having an anode-side separator with projections and depressions formed on its surface, a cathode, and a membrane electrode assembly disposed between the anode and the cathode, and the fuel cell body is disposed in a container for storing liquid fuel so that at least the anode side is immersed therein. Fuel passageways through which the liquid fuel flows are formed by regions surrounded by the projections and depressions on the surface of the separator and the membrane electrode assembly. By this, the downsized, simplified and lower power consuming structure of auxiliary equipment such as a fuel feed system is achieved.

3 Claims, 23 Drawing Sheets

FOREIGN PATENT DOCUMENTS

| | | |
|---|---|---|
| JP | 2-148657 | 6/1990 |
| JP | 2-168564 | 6/1990 |
| JP | 5-258760 | 10/1993 |
| JP | 10-177864 | 6/1998 |
| JP | 2000-100452 | 4/2000 |
| JP | 2001-93540 | 4/2001 |
| JP | 2002-56856 | 2/2002 |
| JP | 2002-110199 | 4/2002 |
| JP | 2002-175817 | 6/2002 |
| JP | 2002-252004 | 9/2002 |
| JP | 2002-373684 | 12/2002 |
| JP | 2003-68325 | 3/2003 |

\* cited by examiner

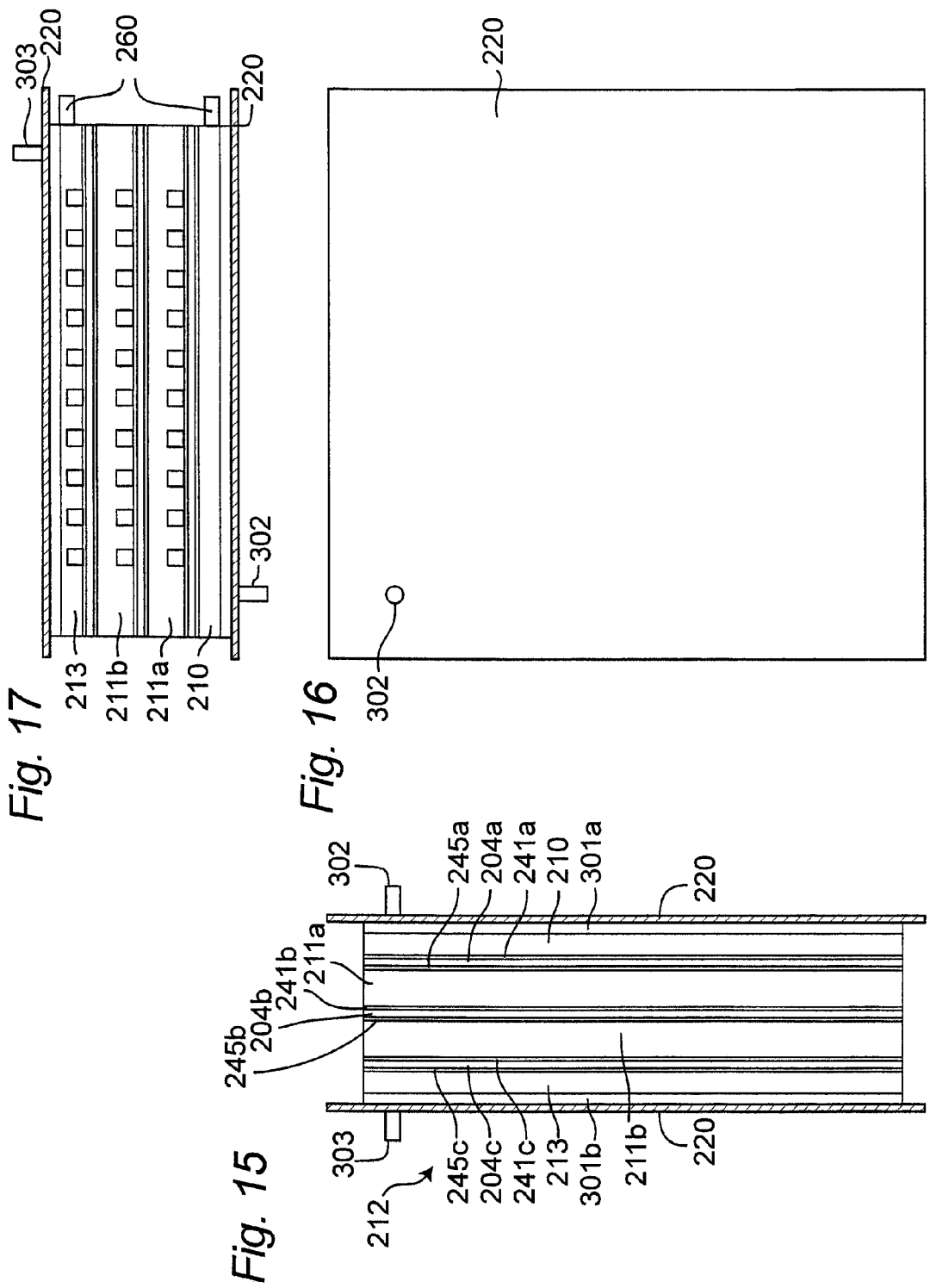

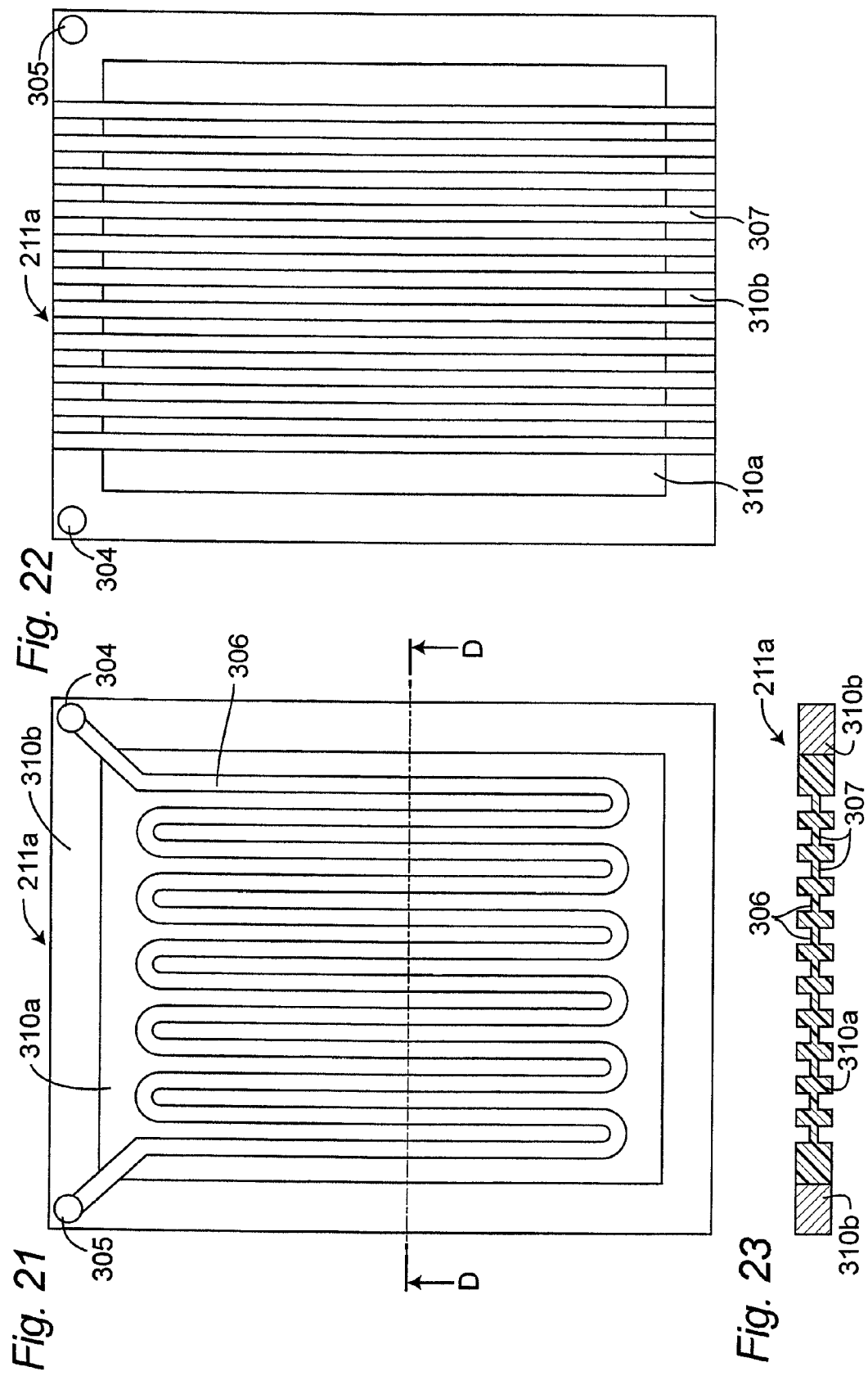

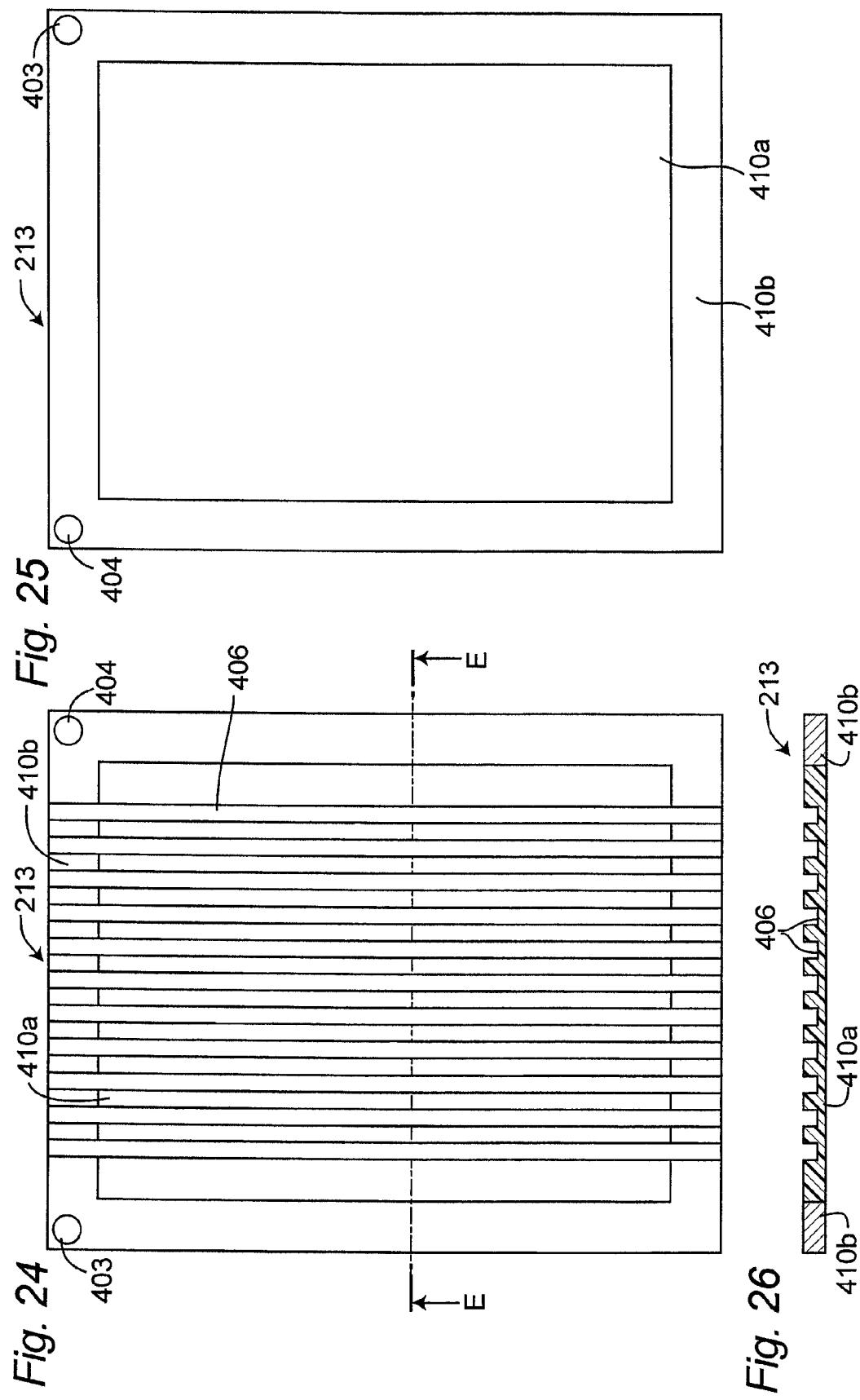

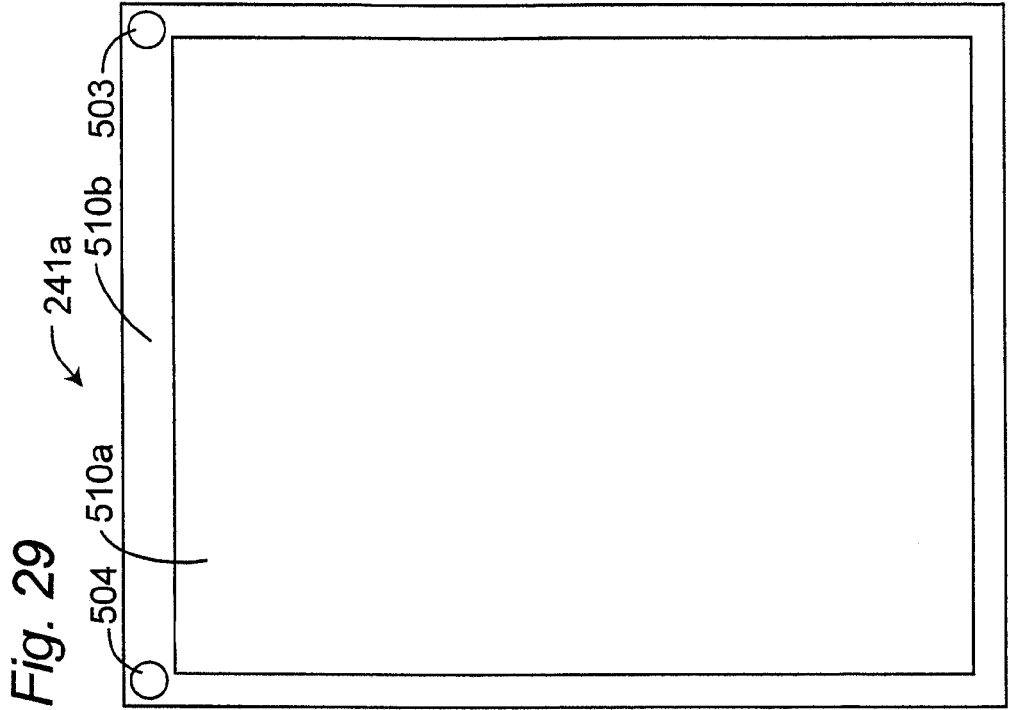
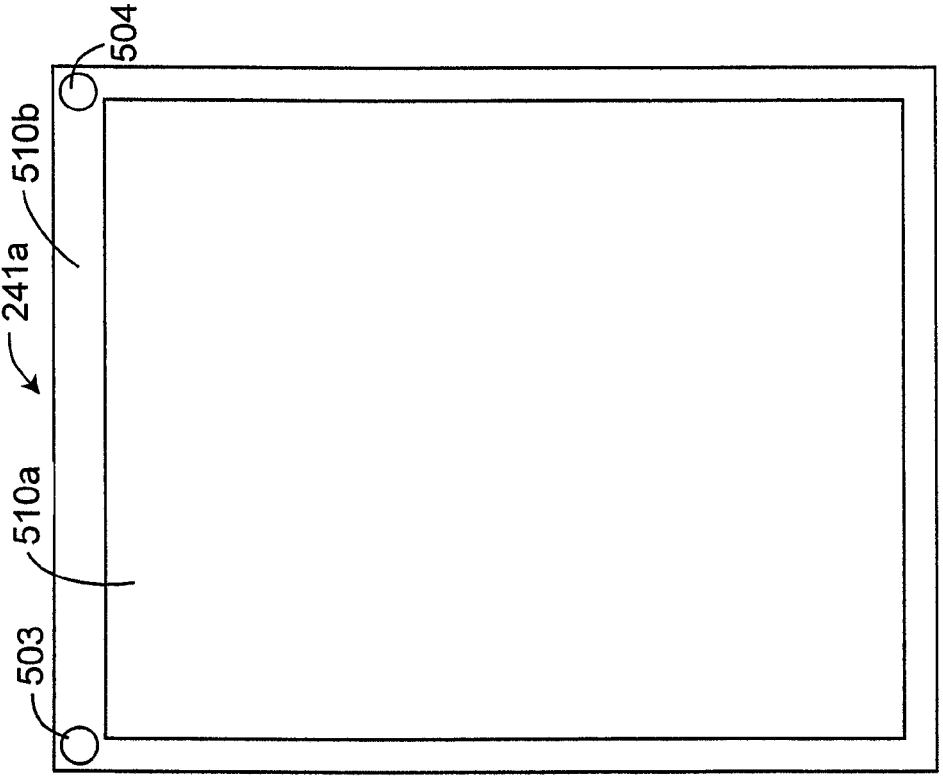

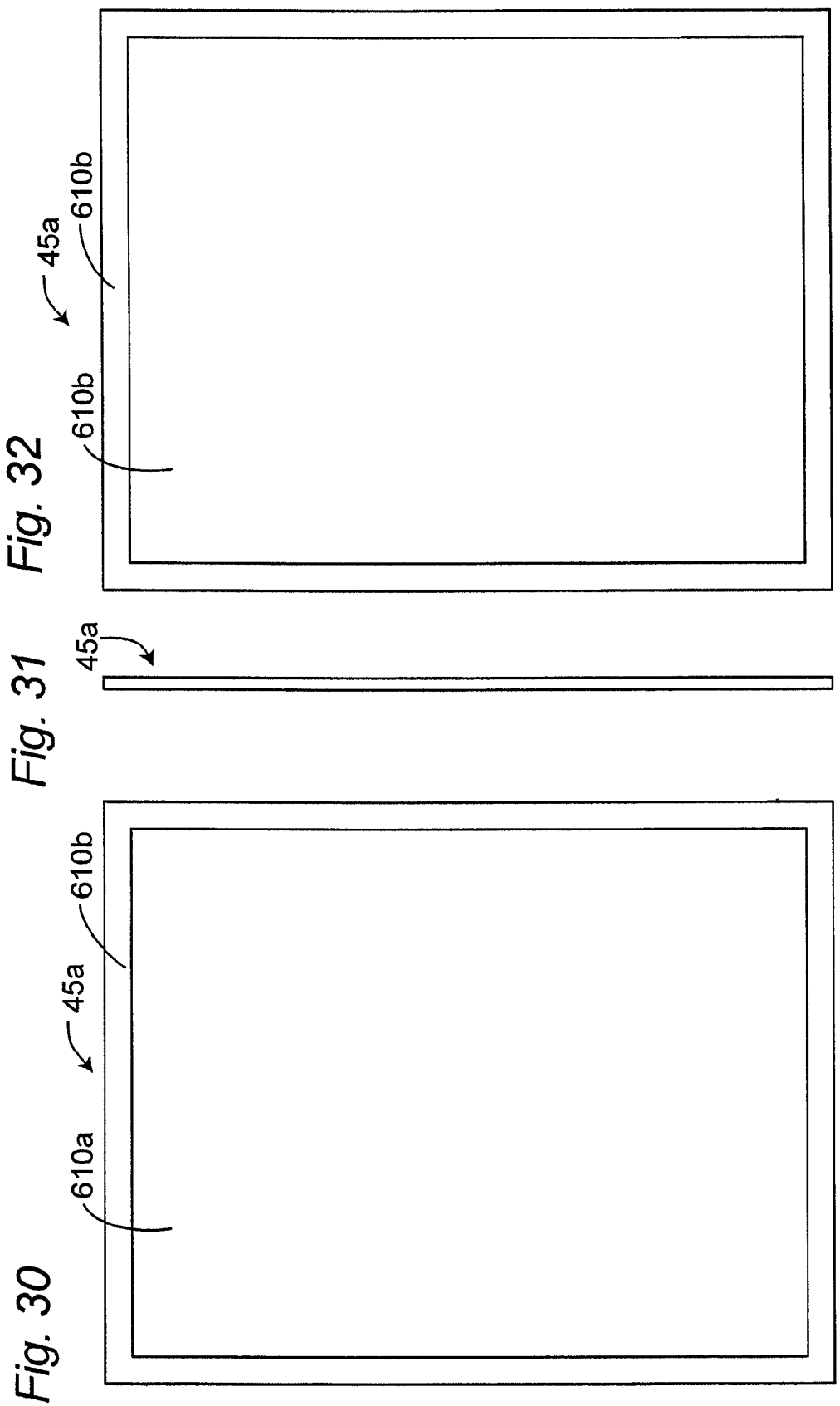

FUEL CELL

This is a divisional application of U.S. patent application Ser. No. 10/868,778, filed Jun. 17, 2004, now U.S. Pat. No. 7,479,342.

BACKGROUND OF THE INVENTION

The present invention relates to a fuel cell, and more particularly to a type of fuel cell that generates electric power by feeding organic liquid fuel such as methanol directly to an anode.

Portable electronic equipment such as cell phones, personal digital assistants, notebook-sized personal computers, portable audios and portable visuals has been becoming popular. Such portable electronic equipment is conventionally driven by primary batteries or secondary batteries. Particularly, Nickel-Cadmium batteries or lithium-ion batteries are used as the secondary batteries, and development of downsized batteries with high-energy density have been developed. However, since the secondary batteries need to be charged for a specified period of time after consumption of a specific amount of electric power, the batteries supporting continuous long-run driving with short charging time have been demanded.

In order to meet the demand, fuel cells operated without charging have been proposed. The fuel cells are generators for electrochemically converting chemical energy of fuel to electric energy. One such fuel cell is a Polymer Electrolyte Fuel Cell (PEFC) for generating electric power with use of a perfluorocarbon sulfonic acid-based electrolyte to reduce hydrogen gas in an anode and to reduce oxygen in a cathode. Such PEFC has a feature of batteries with high power density, and its development is being pursued.

However, hydrogen gas used in such PEFC is low in volume energy density, which requires the volume of a fuel tank to be enlarged. Further, the PEFC needs to be equipped with auxiliary equipment such as devices to feed fuel gas and oxide gas to a fuel cell body (generation section) and humidifiers for stabilizing battery performance, which increases the size of a fuel cell system. Therefore, the PEFC is not suitable as a power source for portable electronic equipment.

A Direct Methanol Fuel Cell (DMFC) for generating electric power by directly extracting protons from methanol, although having a disadvantage in that its output is smaller than that of the PEFC, has advantages in that the volume energy density of fuel can be increased and auxiliary equipment of the fuel cell body can be reduced, which allows downsizing. Because of this reason, the DMFC is drawing attention and several proposals regarding the DMFC have been made.

The reaction on the anode side and the reaction on the cathode side which takes place inside the fuel cell body of the DMFC are as follows:

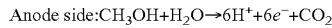

Anode side: $CH_3OH + H_2O \rightarrow 6H^+ + 6e^- + CO_2$

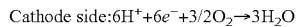

Cathode side: $6H^+ + 6e^- + 3/2 O_2 \rightarrow 3H_2O$

As shown in the above chemical formulas, power generation with use of the fuel cell leads to generation of carbon dioxide ($CO_2$) on the anode side and water ($H_2O$) on the cathode side. Consequently, in order to carry out continuous power generation, it is necessary to establish a fuel cell system including auxiliary equipment for treating the produced carbon dioxide and water.

An example of the structure of such conventional DMFC-type fuel cells is found in U.S. Pat. No. 5,599,638 (FIG. 1 and FIG. 2). This fuel cell system adopts a fuel circulation system in which a pump is used for stably feeding methanol solution to an anode from a circulation tank containing the methanol solution as a fuel, and unconsumed methanol solution remaining in the anode is returned to the circulation tank to be recycled as a fuel.

The water ($H_2O$) produced by power generation on the cathode side is collected by a water collector and sent to the circulation tank containing methanol solution.

Generally, the fuel cell body is often constituted such that fuel and oxygen passageways in the anode and the cathode would be lengthened so as to prolong residence time of fuel and oxygen in the anode and the cathode for increasing the reaction of fuel and oxygen fed to the anode or the cathode. For example, a separator is used which is constituted of a conductive material such as carbon materials or the like, and is composed of one inlet, one outlet, and a plurality of grooves meandering between the upper end and the lower end.

SUMMARY OF THE INVENTION

However, in the fuel cell formed with this separator, the grooves formed on the surface of the separator serve as fuel and oxygen passageways so that the residence time in the anode and the cathode is prolonged, though a high pressure is required to let them flow. Particularly in the fuel cell system disclosed in U.S. Pat. No. 5,599,638, a pump for feeding fuel from a methanol storage tank to a circulation tank is necessary, so that total two pumps are used in the auxiliary equipment system for feeding fuel to the anode. In such a case, downsizing of the fuel cell system is not feasible, making it difficult to apply the fuel cell system to the portable electronic equipment and the like.

Further, in the structure which requires the auxiliary equipment system for fuel supply, electric power necessary for driving the auxiliary system need to be supplemented by power generation with the fuel cell system. This also causes a problem in that power supply for driving the auxiliary system would inhibit the efficiency of power generation in the fuel cell system. Particularly, this kind of problem tends to be more apparent as downsizing of the fuel cell system itself progresses. For example, if the power generation output of the fuel cell system is 12 W, then power consumption by the auxiliary equipment should preferably be 2 W or less.

Further, a fuel cell system with a high power generation output can be obtained by including a plurality of fuel cell bodies for use in the system. However, simply using a plurality of independent fuel cell bodies increases power consumption of auxiliary equipment required by individual fuel cells to generate electric power, leading to upsizing of the entire system.

Further, in the aforementioned conventional DMFC method, as shown in the chemical formulas, if 1 mol methanol and 1 mol water out of a methanol solution fed to the anode are consumed for power generation, 3 mol water is produced in the cathode. Consequently, collecting and feeding all the produced water to the circulation tank promotes significant decrease in the concentration of the methanol solution in the circulation tank, thereby causing problems of shortened power generation time and a reduced electricity amount.

In order to solve these problems, there are possibly two primarily methods.

The first one is a method in which only part of the water out of the water collected by the water collector is fed to the circulation tank so as to prevent a significant decrease in the concentration of the methanol solution.

The second one is a method in which all the water collected by the water collector is fed to the circulation tank, which itself has a large capacity so that the collection of water should not cause a significant decrease in the concentration of the methanol solution.

However, although the first method may be adopted as a fuel cell system for automobiles and large-scale apparatuses, water not collected to the circulation tank should be discharged, which increases the possibility that water may be attached to electronic equipment and circuits incorporated in portable electronic equipment or due condensation may be formed thereon, making it difficult to adopt the method as the fuel cell system for the portable electronic equipment.

The second method is contradicted to downsizing pursuit of the fuel cell system, and therefore it cannot be adopted as the fuel cell system for the portable electronic equipment.

Accordingly, an object of the present invention is to provide, so as to solve the above problems, a fuel cell for generating electric power with use of organic liquid fuel such as methanol, which enables auxiliary equipment such as fuel feed system to have a downsized, simplified and lower power consuming structure.

In accomplishing these and other aspects, according to a first aspect of the present invention, a fuel cell comprises:

a fuel cell body including an anode having an anode-side separator that is flat in a thickness direction and has projections and depressions formed on its surface, a cathode disposing so as to face to the anode, and a membrane electrode assembly disposed between the anode and the cathode; and a container for containing liquid fuel which is fed to the anode and housing at least the anode of the fuel cell body so as to be immersed in the liquid fuel, wherein the fuel cell body has passageways surrounded by the projections and depressions formed on the surface of the anode-side separator and a surface of the membrane electrode assembly, and the fuel passageways are connected to a feed port and a discharge port so as to extend in almost one direction from the feed port to the discharge port provided at a position higher than the feed port.

According to a second aspect of the present invention, a fuel cell as defined in the first aspect is provided, wherein the anode-side separator is composed of a plate body formed in a corrugated shape.

According to a third aspect of the present invention, a fuel cell as defined in the second aspect is provided, wherein the anode-side separator is formed in the corrugated shape in which a valley portion formed on a surface on a side in contact with the membrane electrode assembly is larger than a valley portion formed on a surface on a side not in contact with the membrane electrode assembly.

According to a fourth aspect of the present invention, a fuel cell as defined in the second aspect is provided, wherein the anode-side separator has through holes extending from its front surface to its back surface, the through holes being used as fuel passageways connecting the front surface-side fuel passageway and the back surface-side fuel passageway.

According to a fifth aspect of the present invention, a fuel cell as defined in the first aspect is provided, wherein the fuel passageways extending in almost one direction are disposed so as to be inclined from a direction extending from the feed port to the discharge port.

According to a sixth aspect of the present invention, a fuel cell as defined in the first aspect is provided, wherein the cathode has a cathode-side separator that is flat in a thickness direction and has projections and depressions formed on its surface.

According to a seventh aspect of the present invention, a fuel cell comprising a fuel cell concatenated-body composed of a plurality of the fuel cell bodies for use in the fuel cell as defined in the sixth aspect is provided, which are concatenated in close contact with each other in a thickness direction, wherein in each of the fuel cell bodies, the anode-side separator and the cathode-side separator have the projections and depressions formed on surfaces on a side in contact with the membrane electrode assembly, and adjacent fuel cell bodies are disposed so that same poles thereof face each other to enable the adjacent fuel cell bodies to share the same kind of separators.

According to an eighth aspect of the present invention, a fuel cell as defined in the seventh aspect is provided, wherein the shared cathode-side separators are composed of nonconductive materials, and in the respective membrane electrode assemblies, respective conductive diffusion layers disposed on surfaces in contact with the cathode-side separators serve as respective cathode-side electrodes.

According to a ninth aspect of the present invention, a fuel cell as defined in the seventh aspect is provided, wherein the fuel cell concatenated-body is disposed so that its entire body is immersed in the liquid fuel contained in the container.

According to a tenth aspect of the present invention, a fuel cell as defined in the seventh aspect is provided, wherein the shared cathode-side separator has a slit-like hole penetrated through the separator in the thickness direction as an oxygen passageway.

According to an eleventh aspect of the present invention, a fuel cell as defined in the tenth aspect is provided, wherein the slit-like hole has a meandering shape.

According to a twelfth aspect of the present invention, a fuel cell as defined in the seventh aspect is provided, wherein in each of the anode-side separators, the fuel passageways extending in almost one direction are disposed so as to be inclined from a direction extending from the feed port to the discharge port, and the inclined direction of the anode-side separators is opposite to the inclined direction of the anode-side separator disposed next thereto.

According to a thirteenth aspect of the present invention, a fuel cell as defined in the first aspect is provided, wherein the anode-side separator is made of resin.

According to a fourteenth aspect of the present invention, a fuel cell, comprising a fuel cell concatenated-body composed of a plurality of the fuel cell bodies for use in the fuel cell as defined in the sixth aspect is provided, which are concatenated in close contact with each other in a thickness direction, wherein in each of the fuel cell bodies, the anode-side separator and the cathode-side separator have the projections and depressions formed on surfaces on a side in contact with the membrane electrode assembly, and the adjacent fuel cell bodies are disposed so that different poles thereof face each other, and a conductive portion made of a conductive material is formed on at least a part of a peripheral portion of the separator disposed between the adjacent fuel cell bodies so that the different poles thereof are electrically connected to each other.

According to a fifteenth aspect of the present invention, a fuel cell as defined in the fourteenth aspect is provided, wherein in the separator, a portion forming the projections and depressions is made of a nonconductive material and the conductive portion is formed so as to be disposed on the entire peripheral portion.

According to a sixteenth aspect of the present invention, a fuel cell as defined in the first aspect is provided, further comprising:

a first fuel container, as the container, for containing the liquid fuel and housing the anode therein so as to feed the contained liquid fuel to the anode;

a second fuel container for containing liquid fuel concentrate higher in concentration than the liquid fuel contained in the first fuel container so as to feed the liquid fuel concentrate to the first fuel container; and a collection amount regulator for adjusting respective collection amounts of a product produced in the cathode to the first fuel container and the second fuel container.

According to a seventeenth aspect of the present invention, a fuel cell as defined in the sixteenth aspect is provided, further comprising:

a liquid concentrate feed unit for feeding the liquid fuel concentrate in the second fuel container to the first fuel container;

a product collection passageway connecting the cathode, the first fuel container and the second fuel container so that the product is fed and collected into the first fuel container or the second fuel container, the collection amount regulator being disposed at some midway of the product collection passageway.

According to an eighteenth aspect of the present invention, a fuel cell as defined in the seventeenth aspect is provided, further comprising, a control unit for controlling the collection amount regulator to control collection amounts of the product into the first fuel container or the second fuel container, as well as controlling the liquid concentrate feed unit to control a feed amount of the liquid fuel concentrate to the first fuel container so as to supply the liquid fuel consumed by power generation in the first fuel container.

According to a nineteenth aspect of the present invention, a fuel cell as defined in the eighteenth aspect is provided, further comprising a concentration detector for detecting concentration of the liquid fuel contained in the first container, wherein the control unit controls a feed amount of the liquid fuel concentrate by the liquid fuel concentrate feed unit and a collection amount of the product into the first fuel container by the collection amount regulator, so that the concentration of the liquid fuel detected by the concentration detector is within a concentration range allowing power generation.

According to a twentieth aspect of the present invention, a fuel cell as defined in the eighteenth aspect is provided, further comprising an electricity amount detector for detecting the generated electricity amount, wherein the control unit calculates a supply amount of the liquid fuel consumed by the power generation based on the electricity amount detected by the electricity amount detector, and controls a feed amount of the liquid fuel concentrate by the liquid concentrate feed unit and a collection amount of the product into the first fuel container by the collection amount regulator based on the calculation result.

According to a twenty-first aspect of the present invention, a fuel cell as defined in the eighteenth aspect is provided, wherein the first container further has a content detector for detecting a content of the liquid fuel, and the control unit controls a feed amount of the liquid fuel concentrate by the liquid concentrate feed unit and a collection amount of the product into the first fuel container by the collection amount regulator, so that the content in the first fuel container detected by the content detector becomes a specified liquid amount.

According to a twenty-second aspect of the present invention, a fuel cell as defined in the seventeenth aspect is provided, wherein the product contains water as a primary ingredient, and the liquid fuel contained in the first fuel container is a liquid obtained by diluting the liquid fuel concentrate by adding water.

According to a twenty-third aspect of the present invention, a fuel cell as defined in the twenty-second aspect is provided, wherein the liquid fuel is a methanol solution with a concentration within a range of 1 to 10 wt %, that is a concentration range allowing power generation, while the liquid fuel concentrate is a methanol solution higher in concentration than the methanol solution or a methanol concentrate.

According to a twenty-fourth aspect of the present invention, there is provided a fuel cell, comprising:

a fuel cell body including an anode having an anode-side separator that is flat in a thickness direction and has projections and depressions formed on its surface, a cathode disposing so as to face to the anode and having a cathode-side separator that is made of a nonconductive material, flat in a thickness direction and has projections and depressions formed on its surface, and a membrane electrode assembly disposed between the anode and the cathode; and a container for containing liquid fuel which is fed to the anode and housing at least the anode of the fuel cell body so as to be immersed in the liquid fuel, wherein the fuel cell body has fuel passageways surrounded by the projections and depressions formed on the surface of the anode-side separator and a surface of the membrane electrode assembly, and the fuel passageways are connected to a feed port and a discharge port so as to extend in almost one direction from the feed port to the discharge port provided at a position higher than the feed port.

According to a twenty-fifth aspect of the present invention, a fuel cell as defined in the twenty-fourth aspect is provided, wherein in the membrane electrode assembly, a conductive diffusion layer disposed on a surface in contact with the cathode-side separator serve as a cathode-side electrode.

According to the first aspect of the present invention, the anode in the fuel cell body is disposed so as to be immersed in the liquid fuel contained in the container, which allows the liquid fuel contained in the container to travel through the anode and to be fed. The anode of the fuel cell body has fuel passageways formed by the anode-side separator and the membrane electrode assembly, and the liquid fuel may travel through the fuel passageways. While traveling through the fuel passageways, the liquid fuel is decomposed by an anode reaction to proton and carbon dioxide. Consequently, the carbon dioxide produced in the anode promotes the liquid fuel in the anode to flow, which makes it possible to generate electric power for a long period of time. More specifically, in the above structure, the fuel passageways are structured to be extended in almost one direction from a feed port to a discharge port provided at a position higher than the feed port, so that carbon dioxide produced by the anode reaction during traveling through the fuel passageways rises and moves toward the discharge port. Eventually, the liquid density in the fuel passageways is decreased toward the discharge port, which means thrust is generated to send the liquid toward the discharge port side, enabling the liquid fuel to flow.

This enables the liquid fuel to be efficiently fed into the anode without the necessity of particular power such as pumps, making it possible to provide a small-size and light-weight fuel cell with reduced number of auxiliary equipment.

According to the second aspect of the present invention, the anode-side separator is formed in a corrugated shape. This makes it possible to reduce a contact area between the anode-side separator and the membrane electrode assembly and increase an area of the liquid fuel in the fuel passageways coming in contact with the surface of the membrane electrode assembly, which allows more efficient progress of the anode reaction. Therefore, it becomes possible to provide a fuel cell which implements efficient power generation.

According to the third aspect of the present invention, the anode-side separator is formed in the corrugated shape in which a valley portion formed on the surface on the side in contact with the membrane electrode assembly is larger than a valley portion formed on the surface on the side not in contact with the membrane electrode assembly. This makes it possible to increase the volume of the fuel passageways on the side in contact with the membrane electrode assembly and allows a larger amount of liquid fuel to flow, so that the volume of the liquid fuel available in the anode reaction may be increased and amounts of proton and carbon dioxide to be produced may be increased. Therefore, more efficient convection of the liquid fuel in the anode becomes possible.

According to the fourth aspect of the present invention, in the case where the fuel cell is disposed so as to be inclined from the surface side of the anode-side separator, carbon dioxide may be moved from one surface side to the other surface side of the anode-side separator through a through hole formed in the separator. This makes it possible to prevent the liquid fuel from being accumulated in the anode and implements more efficient feed of the liquid fuel to the anode.

According to the fifth aspect of the present invention, the fuel passageways are disposed so as to be inclined from the direction extending from the feed port to the discharge port, so that carbon dioxide may be moved along the inclined fuel passageways, making it possible to prevent the liquid fuel from being accumulated in the anode and implementing more efficient feed of the liquid fuel to the anode.

According to the sixth aspect of the present invention, in the case where a cathode-side separator is disposed on the cathode side in addition to the anode-side separator disposed on the anode side in the fuel cell body, it still becomes possible to provide a fuel cell capable of achieving the effects in the aforementioned respective aspects.

According to the seventh aspect of the present invention, in respective separators, the projections and depressions are formed on the surface on the side in contact with the membrane electrode assembly, and the adjacent fuel cell bodies are disposed facing each other so that the adjacent fuel cell bodies may share the same kind of separators. Therefore, it becomes possible to structure a small-size fuel cell concatenated-body formed by concatenating respective fuel cell bodies.

Further, the respective fuel cell bodies included in the fuel cell concatenated-body can efficiently feed the liquid fuel to the anode without needing a specific structure that requires power such as pumps on the respective fuel passageways. Consequently, even if a plurality of the fuel cell bodies are combined, it is not necessary to increase the number of auxiliary equipment necessary for the entire system, so that percentage increases in self power consumption may be reduced.

According to the eighth aspect of the present invention, the separator is made of a nonconductive material, which makes it possible to prevent charges in the poles of the adjacent fuel cell bodies having the same poles from being mixed. Therefore, electric power generated by a plurality of concatenated fuel cell bodies will not decreased, and so the sum of electric power generated by respective fuel cell bodies may become an output of the fuel cell concatenated-body as a whole. Moreover, even in the case where the shared cathode-side separator is made of a nonconductive material, electric power generated by power generation can be outputted if each of the conductive diffusion layers disposed on the surface in contact with the cathode-side separator in respective membrane electrode assemblies has a function as an electrode in respective cathodes. Further, by forming the cathode-side separator not from a conductive material but from a nonconductive material, voltage can be set higher than that in the case of using the conductive material.

According to the ninth aspect of the present invention, all the feed ports of the respective anode-side separators in the fuel cell concatenated-body are disposed in the container, which implements efficient feed of the liquid fuel to the respective anodes with a simple structure.

According to the tenth aspect of the present invention, the shared cathode-side separator is provided with a slit-like hole penetrated through the separator in thickness direction as an oxygen passageway. Consequently, the oxygen passageway can be used as an oxygen passageway for two adjacent fuel cell bodies, making it possible to form a sharable cathode-side separator with a simple structure.

According to the eleventh aspect of the present invention, the slit-like hole formed as the oxygen passageway is in a meandering shape, which enables oxygen to be effectively fed to the cathode through the oxygen passageway.

According to the twelfth aspect of the present invention, in respective anode-side separators, the fuel passageways are disposed so as to be inclined from a direction extending from the feed port to the discharge port, and the inclined direction of one anode-side separator is opposite to the inclined direction of the anode-side separator disposed next thereto. Consequently, even in the case where the fuel cell concatenated-body is disposed so as to be inclined, movement of carbon dioxide may be ensured by either of the anode-side separators. Therefore, it becomes possible to prevent the liquid fuel from being accumulated in the anode and implement more efficient feed of the liquid fuel to the anode.

According to the thirteenth aspect of the present invention, the anode-side separator is made of resin, which makes it possible to decrease the weight of the separator and facilitate molding thereof, thereby achieving mass production of a complicated groove shape.

According to the fourteenth aspect of the present invention, in the case where the fuel cell concatenated-body is formed by concatenating a plurality of the fuel cell bodies, the poles of adjacent fuel cell bodies different from each other can be concatenated, i.e., series concatenation can be implemented. Moreover, a conductive portion made of a conductive material is formed at least on a part of the peripheral portion of the separator disposed between the poles different from each other, so that directly connecting respective conductive portions allows series concatenation without the necessity of interconnections (wiring) for concatenation. This makes it possible to simplify the structure in the fuel cell concatenated-body, thereby allowing provision of a fuel cell reduced in size and weight.

According to the fifteenth aspect of the present invention, the conductive portion is formed so as to be disposed on the entire outer peripheral portion of the separator, which makes it possible to connect the adjacent poles in an electrically more stable state.

According to the sixteenth and the seventeenth aspects of the present invention, there is provided a product collection passageway for collecting a product produced in the cathode by power generation into the first fuel container or the second fuel container. Consequently, the product can be collected into the first fuel container or the second fuel container without being discharged to outside of the fuel cell, which makes it possible to prevent influence of the product produced by power generation from being exerted on the outside of the fuel cell system.

Further, the collection amount regulator provided along the product collection passageway can control a collection amount of the product collected into the first fuel container or the second fuel container, and by controlling a collection amount of the product to the first fuel container as well as controlling a feed amount of liquid fuel concentrate to the first fuel container by the liquid concentrate feed unit so as to supply the liquid fuel consumed by the power generation, the state (e.g., concentration and content) of the liquid fuel contained in the first fuel container may be maintained while the product is collected.

More specifically, a supply amount of the liquid fuel concentrate and the supply amount of the product to the first fuel container are controlled so that the liquid fuel in the first fuel container consumed by the power generation can be supplied, while a portion of the product not necessary for the supply is fed to the second fuel container. Therefore, the state of the liquid fuel in the first fuel container which is directly related to the power generation can be maintained, allowing continuous power generation.

This makes it possible to eliminate the necessity of increasing the volume of the liquid fuel in the first fuel container for maintaining the state thereof while making it possible to collect the product, thereby achieving downsizing of the fuel cell. Therefore, it becomes possible to provide a downsized fuel cell applicable for portable electronic equipment.

According to the eighteenth aspect of the present invention, the control unit controls the collection amount regulator to control a collection amount of the product to the first fuel container or the second fuel container, while at the same time, the control unit controls the liquid concentrate feed unit to control a feed amount of the liquid fuel concentrate from the second fuel container to the first fuel container, which enables the liquid fuel consumed by power generation in the first container to be supplied. Therefore, in the fuel cell body, even if continuous power generation is carried out and the liquid fuel contained in the first fuel container is consumed, the consumed liquid fuel can be supplied so as to maintain the state of the liquid fuel in the first fuel container such as concentration and content, thereby allowing continuous power generation.

Moreover, for example, the consumed liquid fuel is supplied for allowing continuous generation of a specified amount of electricity in the fuel cell body, which makes it possible to provide a fuel cell capable of achieving the effects in the aforementioned respective aspects. For example, in the case where an amount of electricity generated in the power generation has a lower limit, the supply to the first fuel container may be conducted so as to secure the lower-limit electricity amount. Further, for example, in the case where an amount of electricity generated in the power generation has an upper limit in addition to the lower limit, the supply may be conducted so as to secure an electricity amount between the upper limit and the lower limit.

According to the nineteenth aspect of the present invention, this kind of control over the supply of the liquid fuel consumed by the power generation is achieved by detecting the concentration of the liquid fuel contained in the first fuel container by the concentration detector and controlling the detected concentration so as to be in the concentration range allowing power generation, and supply of the consumed liquid fuel in this manner makes it possible to maintain the concentration of the liquid fuel within the concentration range allowing power generation and implement continuous power generation.

According to the twentieth aspect of the present invention, control of the supply amount may also be implemented by calculating a supply amount of the consumed liquid fuel by the control unit through detection of the generated electricity amount instead of direct detection of the concentration.

According to the twenty-first aspect of the present invention, providing a content detector capable of detecting content of the liquid fuel in the first fuel container enables the supply amount to be controlled so that the content of the first fuel container is full. Moreover, providing this kind of unit ensures prevention of liquid leakage caused by overflow and the like in the first fuel container, which makes it possible to provide a fuel cell suitable for portable electronic equipment.

According to the twenty-second aspect of the present invention, the product contains water as a main ingredient, and the liquid fuel is a liquid obtained by diluting the liquid fuel concentrate by adding water, which allows the product to be collected and recycled, thereby achieving the effects in the aforementioned respective aspects.

According to the twenty-third aspect of the present invention, a methanol solution with a concentration within the range of 1 to 10 wt %, that is the concentration range allowing power generation, may be used as the liquid fuel, while a methanol solution higher in concentration than the methanol solution or a methanol concentrate may be used as the liquid fuel concentrate. This makes it possible to achieve the effects in the aforementioned respective aspects.

According to the twenty-fourth aspect of the present invention, the cathode is provided with a cathode-side separator made of a nonconductive material, so that if a resin material is used as the nonconductive material for example, it becomes possible to decrease the weight of the separator and facilitate molding thereof, thereby achieving mass production of a complicated groove shape in addition to the effect of the first aspect.

According to the twenty-fifth aspect of the present invention, even in the case where the cathode-side separator is made of a nonconductive material, electric power generated by power generation in the fuel cell body can be outputted if a conductive diffusion layer disposed on the surface in contact with the cathode-side separator in the membrane electrode assembly has a function as an electrode in the cathode. Further, by forming the cathode-side separator not from a conductive material but from a nonconductive material, voltage can be set higher than that in the case of using the conductive material.

BRIEF DESCRIPTION OF THE DRAWINGS

These and other objects and features of the present invention will become clear from the following description taken in conjunction with the preferred embodiments thereof with reference to the accompanying drawings, in which:

FIGS. 3A and 3B are views showing the structure of a cathode-side separator for use in a cathode in the fuel cell body of FIG. 2, in which FIG. 3A is a plane view and FIG. 3B is a cross sectional view taken in line A-A' in the plane view of FIG. 3A;

FIGS. 4A and 4B are views showing the structure of an anode-side separator for use in an anode in the fuel cell body of FIG. 2, in which FIG. 4A is a fragmental cross sectional perspective view showing the state assembled in a housing, and FIG. 4B is a cross sectional top view, while FIG. 4C is an explanatory view explaining the fluid state of liquid fuel in the direction along the crest line of the separator;

FIGS. 5A and 5B are views showing modified examples of the anode-side separator, in which FIG. 5A is a cross sectional top view showing a first modified example, and FIG. 5B is a cross sectional top view showing a second modified example;

FIGS. 6A and 6B are views showing modified examples of the anode-side separator, in which FIG. 6A is a fragmental cross sectional perspective view showing a third modified example, and FIG. 6B is a perspective view showing only the structure of the anode-side separator of FIG. 6A;

FIGS. 9A and 9B are views showing the schematic structure of fuel cell bodies for use in the fuel cell system of FIG. 7, in which FIG. 9A is a side view and FIG. 9B is a top view;

FIGS. 10A and 10B are views showing the structure of a cathode-side separator for use in a cathode of the fuel cell body of FIGS. 9A and 9B, in which FIG. 10A is a plane view, and FIG. 10B is a cross sectional view taken in line B-B' in the plane view of FIG. 10A;

FIGS. 11A, 11B, 11C and 11D are wiring diagrams of the fuel cell bodies in FIG. 8, in which FIGS. 11A and 11B are wiring diagrams in the case of series connection of four cells, and FIGS. 11C and 11D are wiring diagrams in the case of series connection of two parallel cells;

FIGS. 13A and 13B are schematic perspective views showing the fuel cell system of FIGS. 1 and 7 applied as a cell of notebook-sized personal computers in the form of a fuel cell pack, in which FIG. 13A shows the notebook-sized personal computer in open state, and FIG. 13B shows the same in close state;

FIG. 15 is a side view showing the schematic structure of fuel cell bodies for use in the fuel cell system of FIG. 14;

FIG. 16 is a front view showing the fuel cell bodies of FIG. 15;

FIG. 17 is a top view showing the fuel cell bodies of FIG. 15;

FIG. 21 is a front view showing the structure of the cathode-side separator and an anode-side separator for use in a cathode and an anode in the fuel cell body of FIG. 15;

FIG. 22 is a back view showing the separator of FIG. 21;

FIG. 23 is a cross sectional view showing the separator taken in line D-D' of FIG. 21;

FIG. 24 is a front view showing the structure of the anode-side separator in the fuel cell body of FIG. 15;

FIG. 25 is a back view showing the anode-side separator of FIG. 24;

FIG. 26 is a cross sectional view showing the anode-side separator taken in line E-E' of FIG. 24;

FIG. 27 is a front view showing the structure of an electrode-and-diffusion layer for use in the fuel cell body of FIG. 15;

FIG. 28 is a side view showing the electrode-and-diffusion layer of FIG. 27;

FIG. 29 is a back view showing the electrode-and-diffusion layer of FIG. 27;

FIG. 30 is a front view showing the electrode-and-diffusion layer for use on the cathode side of the fuel cell body of FIG. 15;

FIG. 31 is a side view showing the electrode-and-diffusion layer of FIG. 30;

FIG. 32 is a back view showing the electrode-and-diffusion layer of FIG. 30;

DETAILED DESCRIPTION OF THE PREFERRED EMBODIMENTS

Figure 1:
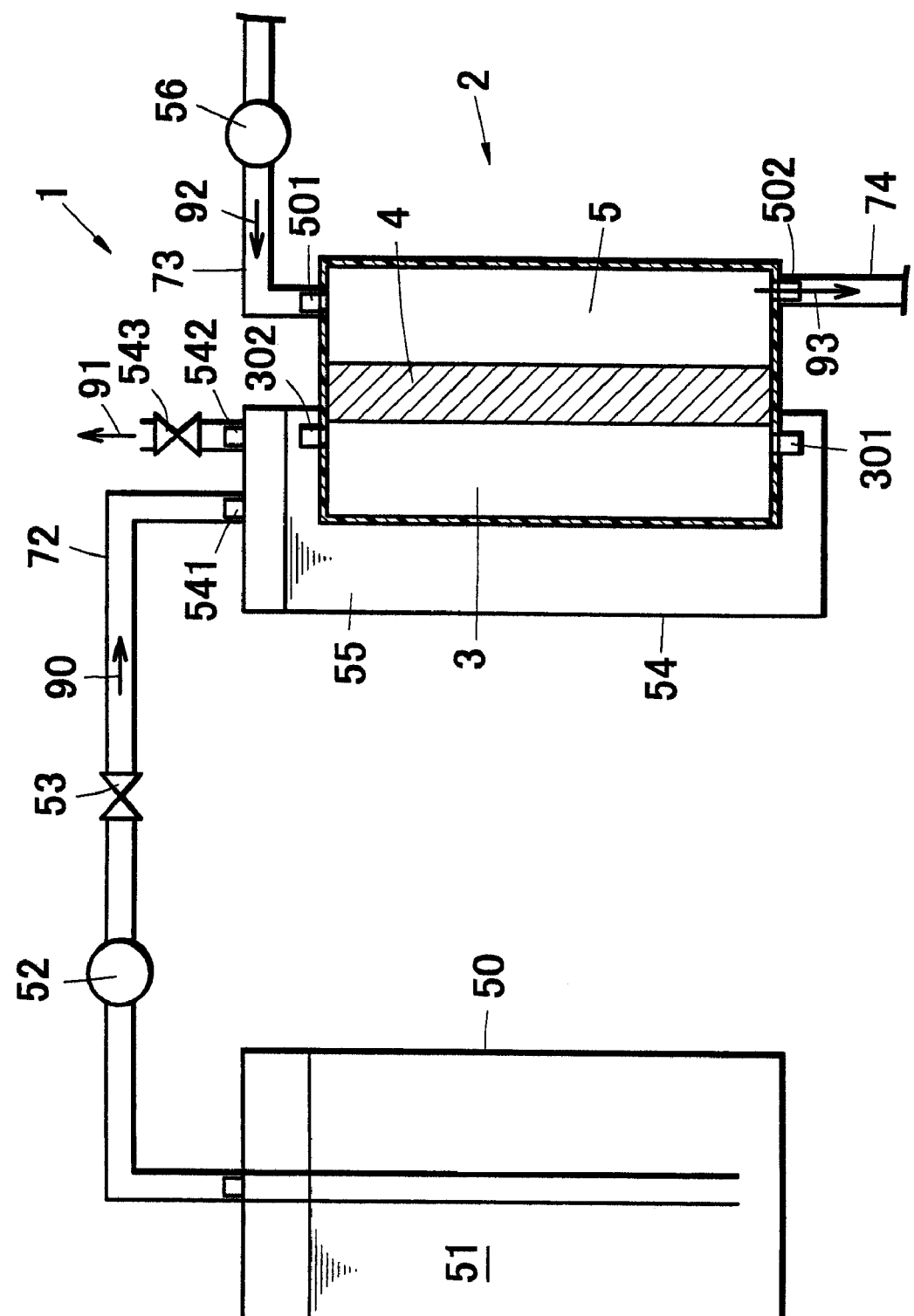
FIG. 1 is a schematic structural view showing a fuel cell system in a first embodiment of the present invention.

Before the description of the present invention proceeds, it is to be noted that like parts are designated by like reference numerals throughout the accompanying drawings.

The fuel cell (it may also be referred to as a fuel cell system) according to each embodiment of the present invention will be described hereinafter in detail with reference to the drawings.

First Embodiment

Figure 2:
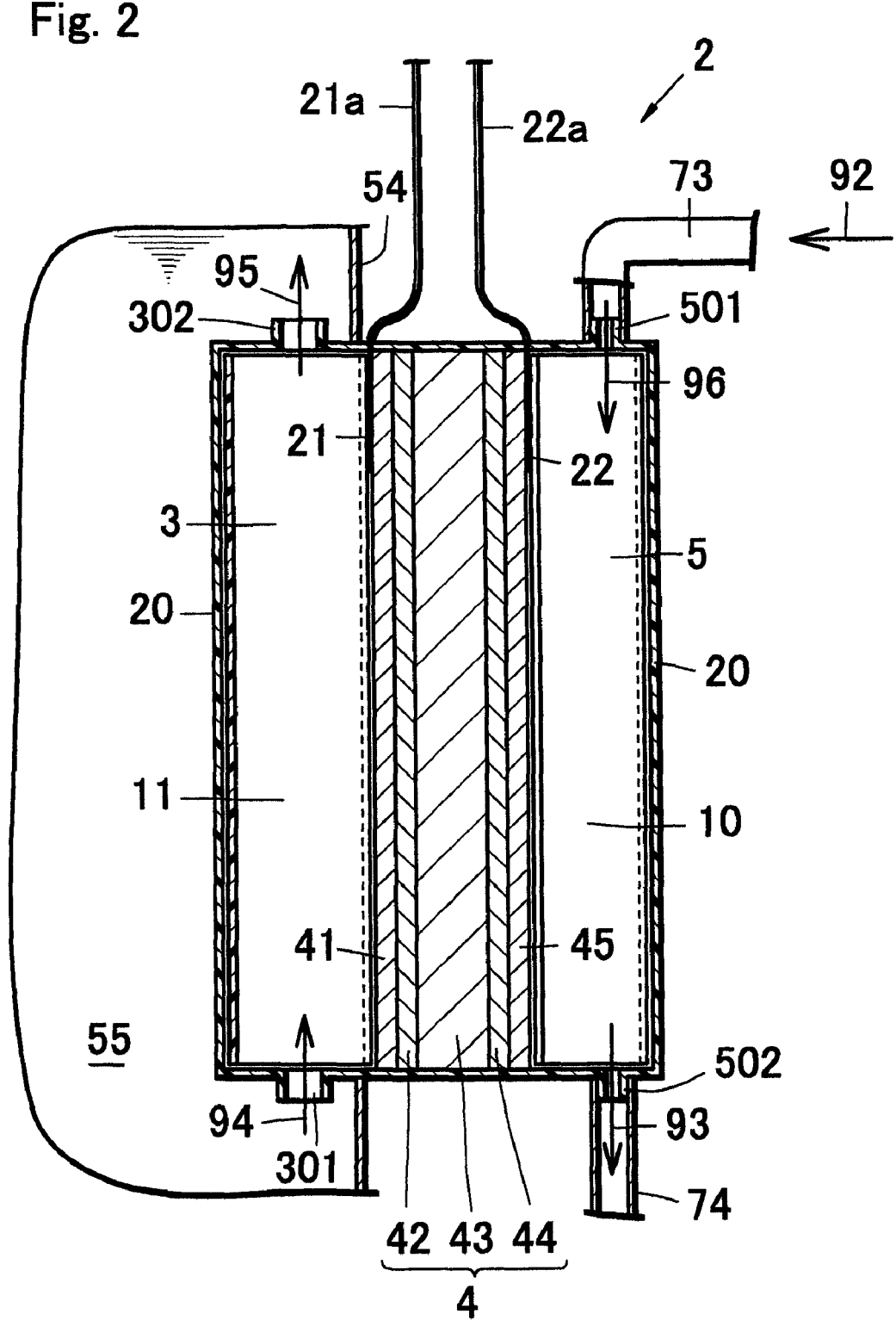
FIG. 2 is a schematic structural view showing a fuel cell body for use in the fuel cell system of FIG. 1.

FIG. 1 is a schematic structural view showing a fuel cell system in the first embodiment of the present invention. FIG. 2 is a schematic structural view showing a fuel cell body for use in the fuel cell system of FIG. 1.

As shown in FIG. 1 and FIG. 2, a fuel cell system 1 has a fuel cell body 2 that is a power generation portion for generating electric power by electrochemically converting chemical energy of fuel to electric energy, and an auxiliary equipment system for operation such as feeding fuel or the like necessary for the power generation to the fuel cell body 2. Moreover, the fuel cell system 1 is a Direct Methanol Fuel Cell (DMFC) for generating electric power with use of a methanol solution exemplifying organic liquid fuel as fuel by directly extracting protons from the methanol.

As shown in FIG. 1, the fuel cell body 2 has an anode (fuel pole) 3, a cathode (air pole) 5 and a membrane electrode assembly 4. The membrane electrode assembly 4 is formed by attaching catalytic layers 42, 44 respectively on both sides of an electrolyte. The anode 3 oxidizes fed methanol and performs a reaction to extract protons and electrons (anode reaction).

The anode 3 has a fuel feed port 301 formed inside the anode 3 for feeding a methanol solution necessary for the anode reaction and a discharge port 302 for discharging carbon dioxide produced by the anode reaction and a remaining methanol solution not used in the reaction from the inside. The discharge port 302 is provided at a position higher than the fuel feed port 301.

The cathode 5 has, for feeding oxygen necessary for the cathode reaction with use of, for example, air, an air feed port 501 for feeding the air to the inside of the cathode 5, and a discharge port 502 for discharging water (including water in both liquid phase or gas phase, and water in the mixed state of both phases) that exemplifies the product produced by the cathode reaction from the inside. It is to be noted that the product contains water as a primary ingredient, and may contain other ingredients such as formic acid, methyl formate and methanol (by later-described cross over).

The electrons move to the anode 3 through electrode lines 21*a*, 22*a* which are electrically connected to electrodes 21, 22 provided on the anode 3 and the cathode 5, whereas the protons move to the cathode 5 through the membrane electrode assembly 4. The cathode 5 performs a reaction (cathode reaction) to reduce the oxygen fed from the outside, the protons moved from the anode 3 through the membrane electrode assembly 4, and the electrons flowing in through the outside circuit so as to produce water. Thus, an oxidative reaction in the anode 3 and a reduction reaction in the cathode 5 are respectively performed and electrons are sent through the electrodes line 21*a*, 22*a*, by which power generation is carried out.

In FIG. 2, the membrane electrode assembly 4 in the fuel cell body 2 may use, for example, a Nafion 117 (trade name) made by DuPont as an electrolyte 43, and on one surface of the electrolyte 43, there is formed as an anode catalyst 42 of the anode 3, carbon powder carriers with platinum and ruthenium, or an alloy of platinum and ruthenium being dispersed therein, while on the other surface, there is formed as a cathode catalyst 44 of the cathode 5, carbon carriers with platinum particles being dispersed therein. On both sides of the membrane electrode assembly 4, electrodes-and-diffusion layers 41, 45 made of, for example, carbon paper are respectively brought into intimate contact with the anode catalyst 42 and the cathode catalyst 44, and then fixed to a housing 20 through an anode-side separator 11 and a cathode-side separator 10, by which the membrane electrode assembly 4 is assembled.

Figure 3:
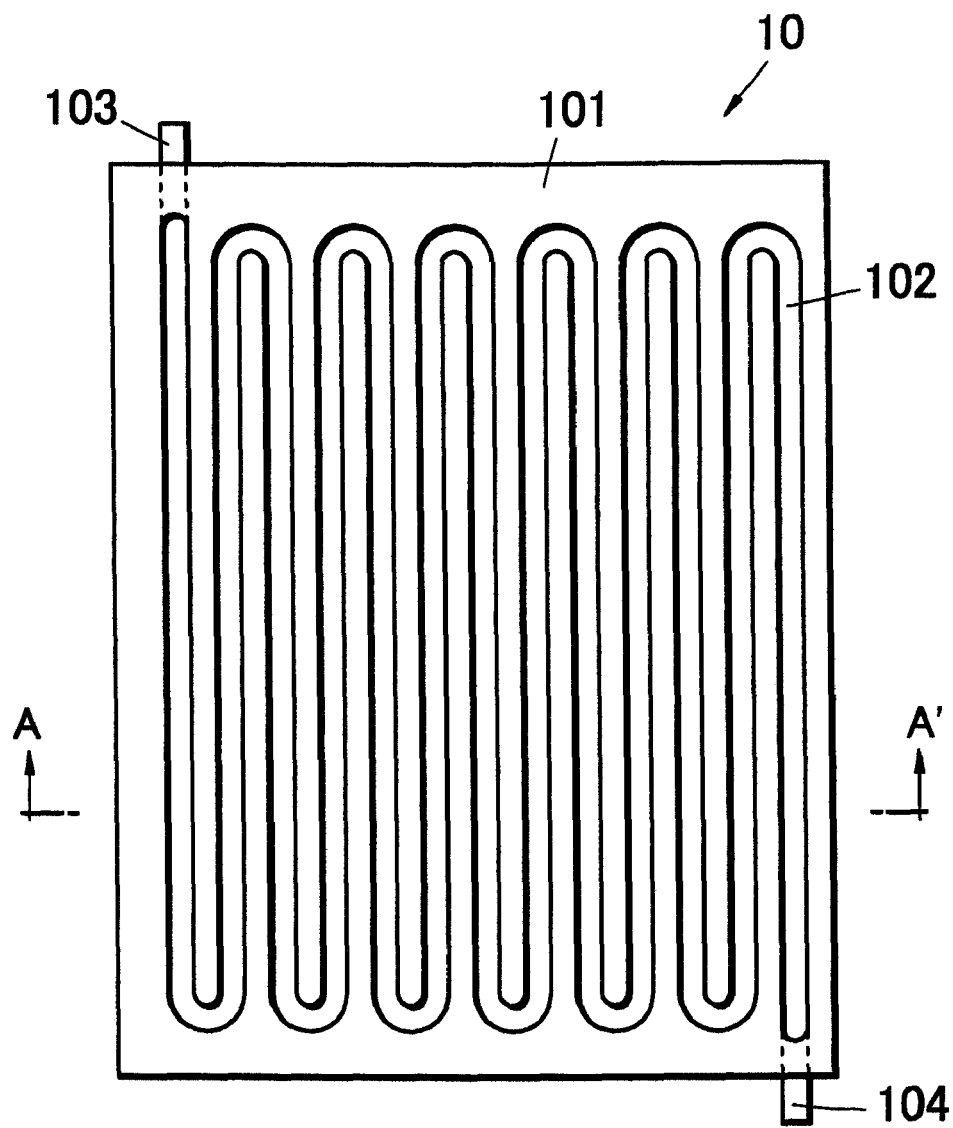
Figure 3:
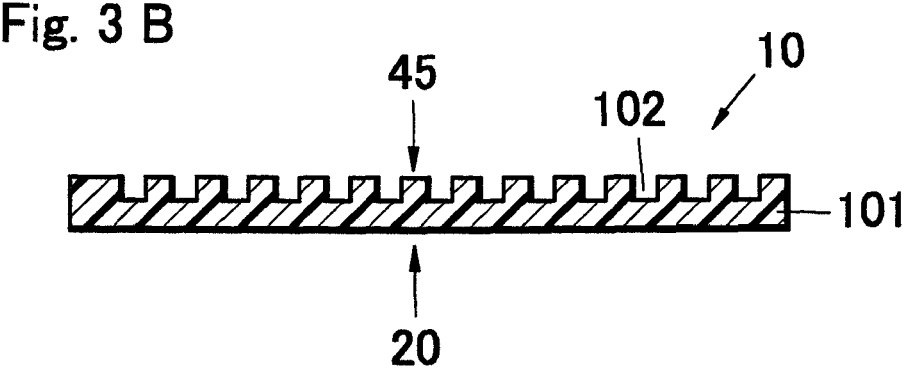

FIGS. 3A and 3B are views showing the structure of the cathode-side separator 10 for use in the cathode 5, in which FIG. 3A is a plane view of the cathode-side separator 10 and FIG. 3B is a cross sectional view taken in line A-A' of FIG. 3A. The cathode-side separator 10 has a plate body 101 that is flat in its thickness direction and made of a nonconductive material with a groove 102 being provided on one surface of the plate body 101. The cathode-side separator 10 is brought into contact with the membrane electrode assembly 4 such that the surface on the side with the groove 102 is pressed to the cathode-side electrodes-and-diffusion layer 45, and a region surrounded by the grooves 102 and the cathode-side electrode-and-diffusion layer 45 is formed as an air passageway. The groove 102 formed on the surface of the cathode-side separator 10 is provided in a meandering shape between the top end and the bottom end of the plate body 101. Moreover, since the groove 102 is connected to a feed port 103 which is connected to the air feed port 501 of the cathode 5 and a discharge port 104 which is connected to the discharge port 502 of the cathode 5, air fed from the air feed port 501 of the cathode 5 can travel from the feed port 103 to the discharge port 104 through the groove 102, and be discharged to the outside from the discharge port 502.

Figure 4:
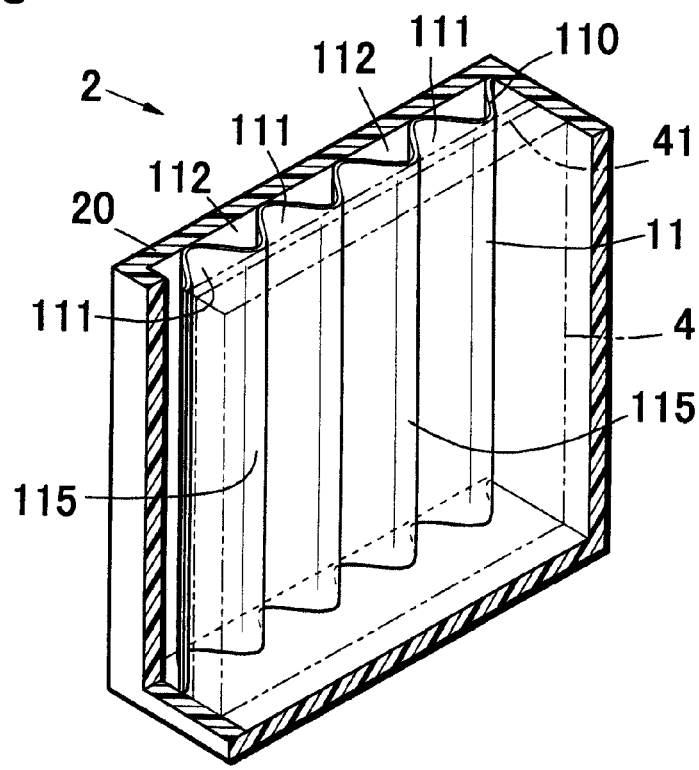
Figure 4:
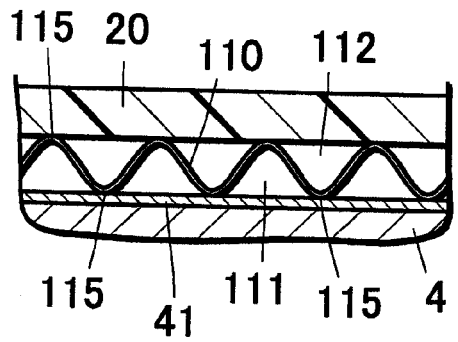
Figure 4:
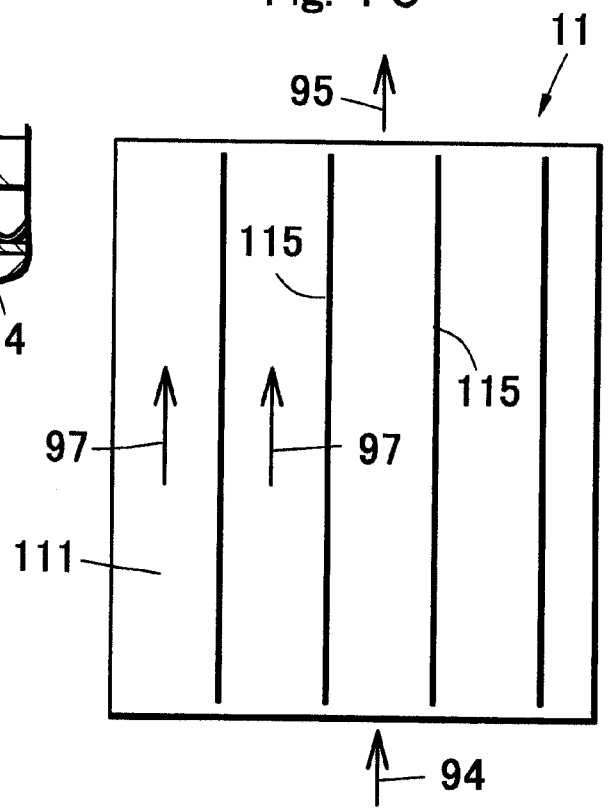

FIGS. 4A, 4B and 4C are views each showing the structure of the anode-side separator 11 for use in the anode 3, in which FIG. 4A is a fragmental cross sectional perspective view showing the anode-side separator 11, and FIG. 4B is a cross sectional top view, while FIG. 4C is an explanatory view explaining the flow of liquid fuel along the crest line. As shown in FIGS. 4A and 4B, the anode-side separator 11 is structured such that a body 110 thereof is flat in its thickness direction and in a corrugated form, and is assembled such that a crest line 115 aligns in a direction extending from the fuel feed port 301 to the discharge port 302 of the anode 3. In the first embodiment, for example, it is preferable that a distance between the crest lines 115 of adjacent waves be about 1 to 5 mm, and the thickness of the separator, i.e., the amplitude of waves, be about 1 to 5 mm. For example, four or more grooves should preferably be disposed on the anode side.

The anode-side separator 11 has passageways (flow path) 111, 112 for carrying liquid fuel formed in valley portions of waves surrounded by the inner wall of the housing 20 in contact, the surface of the electrode-and-diffusion layer 41 and the crest line 115 of adjacent waves. The anode-side separator 11 shown in FIG. 4B has a sine wave form in cross section viewed from top, and therefore the areas of the housing-side passageway 112 and the membrane electrode assembly-side passageway 111 are almost identical.

Moreover, as described above, the fuel cell body 2 has the discharge port 302 provided at the position higher than the fuel feed port 301. Consequently, carbon dioxide, which comes into the passageways 111, 112 of the anode and is produced by the anode reaction, rises toward the discharge port 302 of the anode 3 as shown by an arrow 97 in FIG. 4C and is discharged. Along with the rise of carbon dioxide, fuel in the anode moves to the direction of the arrow 97, and is discharged to the outside from the discharge port 302 of the anode as shown by an arrow 95. When fuel in the anode rises, liquid fuel 55 reserved in a intermediate tank 54 exemplifying the container comes from the fuel feed port of the anode to the inside of the anode as shown by an arrow 94. Thus, in the anode, with use of the carbon dioxide produced by the anode reaction as thrust, feed and discharge of liquid fuel are performed, which brings about convection of the liquid fuel 55 in the intermediate tank 54.

It is to be noted that in the first embodiment, the fuel feed port 301 and the discharge port 302 are relative and therefore both sides may be switched depending on the disposition direction of the fuel cell body 2. For example, in the case where the fuel cell body 2 is disposed upside down from the disposition direction shown in FIG. 2, a port defined by reference numeral 301 is at a position higher than a port defined by reference numeral 302, so that liquid fuel is fed from the port defined by reference numeral 302 (i.e., the port functions as a fuel feed port), and discharged from the port defined by reference numeral 301 (i.e., the port functions as a discharge port).

FIGS. 5A, 5B, 6A and 6B are views showing modified examples of the anode-side separator. An anode-side separator 11*x* as a first modified example shown in FIG. 5A has a body 110*x* formed in a corrugated shape, though the waveform thereof is not symmetric with respect to two sides of the body 110*x*, and crest lines 113 on the side of the electrode-and-diffusion layer 41 are formed to be more acute in angle than crest lines 114 on the side of the housing 20. As a result, membrane electrode assembly-side passageways 111*x* are structured to be larger than housing-side passageways 112*x*. According to the anode-side separator 11*x* of FIG. 5A, an amount of the liquid fuel that comes into contact with the membrane electrode assembly 4, among the liquid fuel fed to the anode 3, can be increased, which enables the anode reaction to progress more efficiently.

Figure 5:
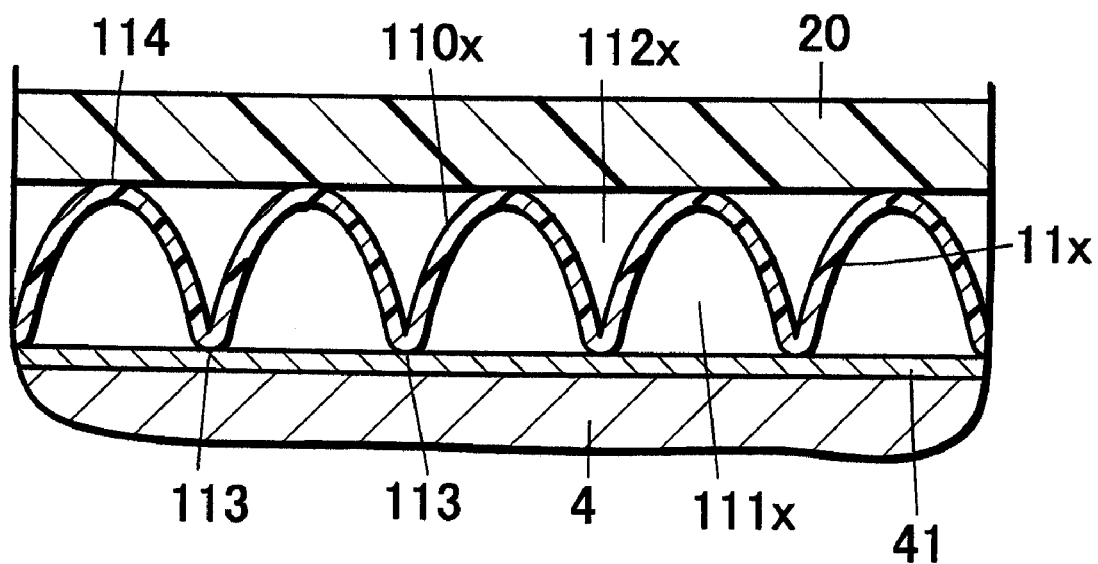
Figure 5:
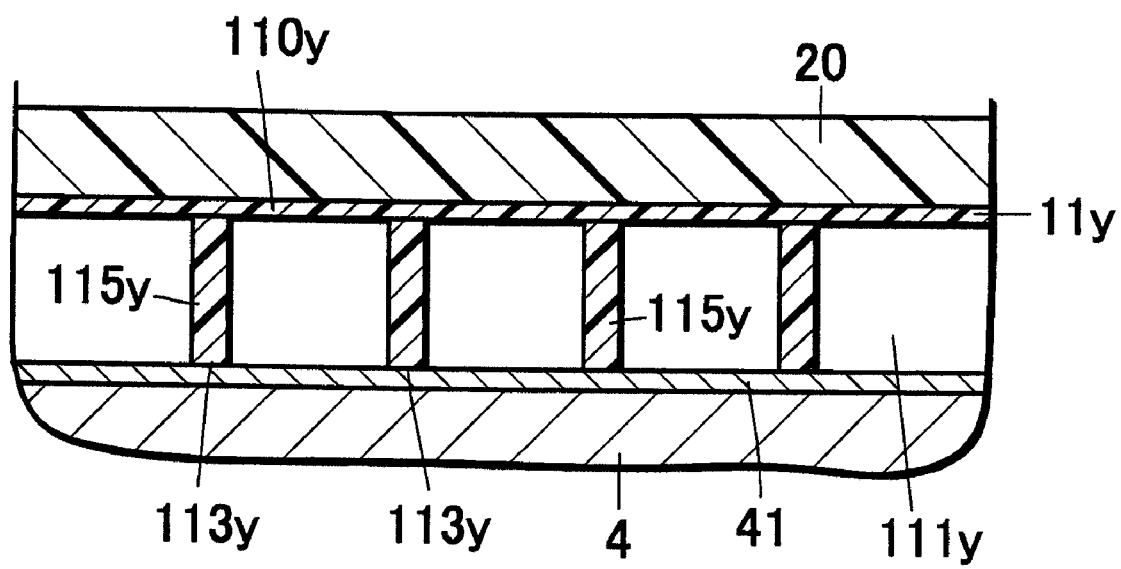
Figure 6:
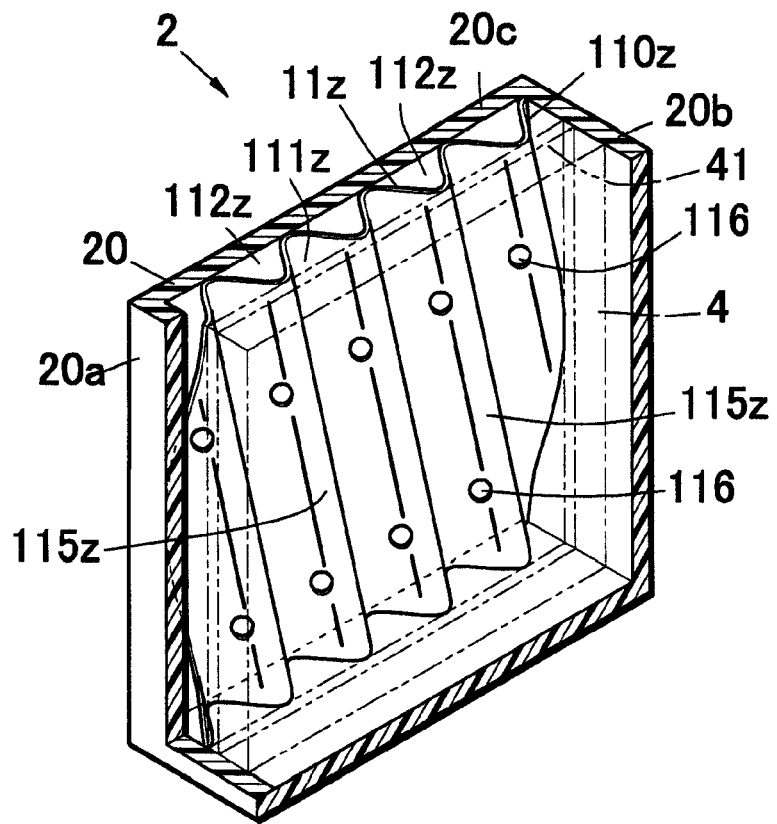
Figure 6:
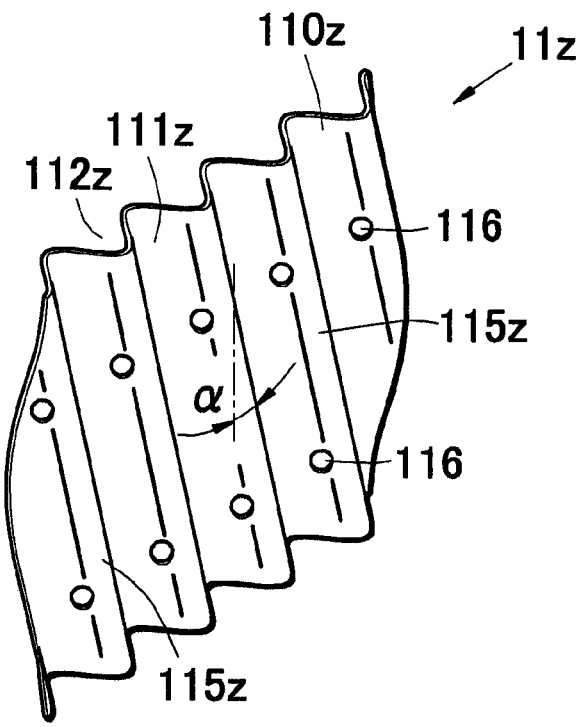

An anode-side separator 11*y* as a second modified example shown in FIG. 5B is structured to have a plurality of partition walls 115*y* extending in a vertical direction from the surface of a thin plate-shaped body 110*y*, and an end portion 113*y* of each of the partition walls 115*y* is brought into contact with the surface of the electrode-and-diffusion layer 41 so as to form a plurality of membrane electrode assembly-side passageways 111y partitioned by each partition wall 115y. The anode-side separator 11y in this example enables a larger amount of liquid fuel fed to the anode 3 to come into contact with the membrane electrode assembly 4. Further, since the body 110y is provided on the entire inner surface of the housing 20, the anode-side separator 11y can be constituted securely, and the electrode-and-diffusion layer 41 can be firmly pressed to the membrane electrode assembly 4 by the anode-side separator 11y.

An anode-side separator 11z as a third modified example of FIG. 6A and FIG. 6B has a plurality of through holes (penetrating holes) 116 going through a body 110z formed in a corrugated shape, and each crest line 115z in the waveform on the body 110z is provided so as to be inclined by an angle α from a line connecting the fuel feed port 301 of the anode 3 and the discharge port 302. Thus, providing each crest line 115z in the waveform so as to be inclined makes it possible to move carbon dioxide produced in the anode 3 to the discharge port 302 side and generates convection of the liquid fuel even if the fuel cell body 2 is disposed such that a side wall 20b of the housing 20 is on the lower side. Further, providing respective through holes 116 on the anode-side separator 11z makes it possible to move carbon dioxide produced in the anode 3 from the membrane electrode assembly-side passageways 111z to the housing-side passageways 112z through respective through holes 116, and generates convection of the liquid fuel even if, for example, the fuel cell body 2 is disposed such that a wall 20c of the housing 20 is on the upper side.

A description is now given of the structure of the auxiliary equipment system in the fuel cell system 1. The auxiliary equipment system has auxiliary equipment for feeding a methanol solution to the anode 3 of the fuel cell body 2 and auxiliary equipment for feeding air to the cathode 5.

First, as shown in FIG. 1, the auxiliary equipment for the fuel feed has an intermediate tank 54 for containing a methanol solution as liquid fuel so as to be fed to the anode 3, a fuel tank 50 for containing a methanol solution 51 with a concentration higher than that of the methanol solution 55 contained in the intermediate tank 54 as liquid fuel concentrate so as to be fed to the intermediate tank 54, a fuel pump 52 exemplifying the liquid concentrate feed unit for feeding the methanol solution 51 contained in the fuel tank 50 to the intermediate tank 54, a liquid concentrate feed pipe 72 having the fuel pump 52 at some midpoint and connecting the fuel tank 50 and the intermediate tank 54, and a fuel valve 53 for changing an amount of liquid fuel concentrate 51 flowing through the liquid concentrate feed pipe 72.

The intermediate tank 54 is structured integrally with the fuel cell body 2, and the anode 3 is incorporated in the intermediate tank 54. When the intermediate tank 54 is filled with not less than a specified amount of liquid fuel 55, the anode 3 is completely immersed in the liquid fuel 55. Thus, disposing the anode 3 in the intermediate tank 54 makes it possible to feed the liquid fuel 55 into the tank through the fuel feed port 301 of the anode 3.

Although in FIG. 1, the entire anode 3 is immersed in the liquid fuel 55, only a part of the anode 3 may be immersed in the liquid fuel 55 instead. In such a case, still at least the fuel feed port 301 and the discharge port 302 need to be immersed in the liquid fuel 55 for keeping convection of the liquid fuel.

Further, gases such as carbon dioxide discharged from the discharge port 302 of the anode flow into the intermediate tank 54. In order to discharge the gases flowing into in this manner, the intermediate tank 54 is equipped with a discharge port 542 and a discharge valve 543. The discharge port 542 should preferably be provided with, for example, a gas-liquid separation membrane which enables only carbon dioxide to be discharged. It is to be noted that the discharge port 542 functions as a gas vent during initial injection of the liquid fuel 55 to the intermediate tank 54.

The fuel tank 50, which contains liquid fuel concentrate 51, is disposed such that one end of the liquid concentrate feed pipe 72 is positioned in the vicinity of the bottom portion of the fuel tank 50. The liquid fuel concentrate 51 contained in the fuel tank 50 is pumped up through the liquid concentrate feed pipe 72 by the fuel pump 52 and fed to the intermediate tank 54.

From the view point that, for example, the fuel pump should be a small-size pump with small power consumption and that controlling the drive time of the fuel pump should enable a feed amount of the liquid fuel concentrate to be controlled, a small-size positive displacement pump or the like should preferably be used as the fuel pump 52. In the first embodiment, for example, there is used a solenoid-operated pump (a check valve incorporated, discharge rate: 0-4 ml/min., discharge pressure: 10 kPa), which in use can be intermittently driven to send out an appropriate amount of liquid fuel concentrate.

Further, the intermediate tank 54 contains, as the liquid fuel 55, a methanol solution in the concentration range of, at percent by weight, 1 to 10 wt %, preferably in the range of 3 to 10 wt %. In the initial state, for example, the intermediate tank 54 contains the methanol solution 55 with a concentration of 6.5 wt %. A fuel tank 50 contains a methanol solution higher in concentration than the liquid fuel contained in the intermediate tank 54 or methanol concentrate (i.e., methanol with a concentration of 100 wt %). In the initial state, for example, the fuel tank 50 contains a methanol solution with a concentration of 68 wt %.

Next, the auxiliary equipment for air feed has, as shown in FIG. 1, an air feed pipe 73 whose one end is connected to the air feed port 501 of the cathode 5, and an air pump 56 disposed at some midway of the air feed pipe 73 for feeding air into the cathode through the air feed pipe 73. As the air pump 56, a small-size pump with small concentration should be preferably used. For example, a motor operated pump is used (a check valve incorporated, discharge rate: 0-2 l/min., discharge pressure: 30 kPa), which in use feeds air at 1 L/min. Moreover, when power generation is executed in the fuel cell body 2, the air pump 56 is driven to feed necessary oxygen into the cathode 5, while when the power generation is stopped, the air pump 56 is stopped driving. It is noted that when the power generation is stopped, the fuel pump 52 is also stopped driving.

Water produced by the cathode reaction in the cathode 5 is discharged from the discharge port 502 through a water discharge pipe 74. Additional auxiliary equipment for collecting the discharged water and feeding it to the intermediate tank 54 may be provided. The case of providing such auxiliary equipment will be explained in a later-described embodiment.

Although in the first embodiment, a description has been given of the fuel cell system 1 in which the fuel cell body 2 is structured to have the membrane electrode assembly 4 interposed in between the anode-side separator 11 and the cathode 5, the first embodiment is not limited to this constitution. For example, instead of this constitution, such constitution may be adopted, in which the fuel cell body 2 has only an anode-side separator 11 as the separator and a cathode-side separator 10 is therefore omitted. In the fuel cell system where a required power generation output is relatively low, air feed to the cathode 5 is achieved by structuring the cathode 5 to be open to the air, by which power generation is successfully conducted.

Second Embodiment

Figure 7:
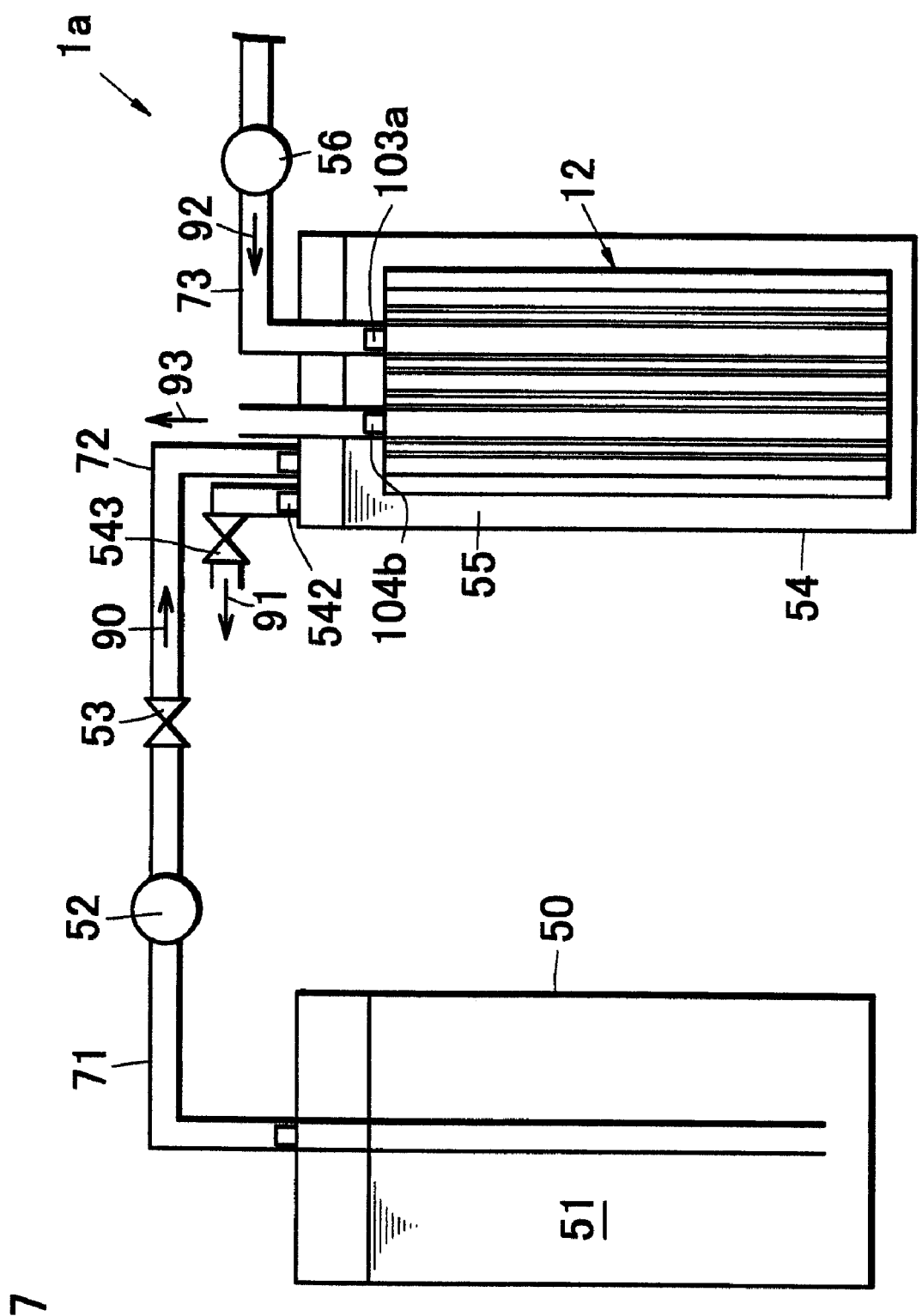
FIG. 7 is a schematic structural view showing a fuel cell system in a second embodiment of the present invention.

A description is now given of a fuel cell system according to the second embodiment of the present invention. FIG. 7 is a schematic structural view showing the fuel cell system in the second embodiment of the present invention. A fuel cell system 1a in the present embodiment is almost identical in structure to the fuel cell system 1 in the first embodiment, and therefore description herein will be focused on difference therebetween.

The fuel cell system 1a in the second embodiment is a fuel cell system with use of a Direct Methanol Fuel Cell (DMFC) which generates electric power by directly extracting protons from methanol. The fuel cell body 2 shares the structure of the fuel cell system 1 in the first embodiment.

As shown in FIG. 7, the entire fuel cell body 12 is disposed so as to be completely immersed in an intermediate tank 54 that is auxiliary equipment for fuel feed.

Figure 8:
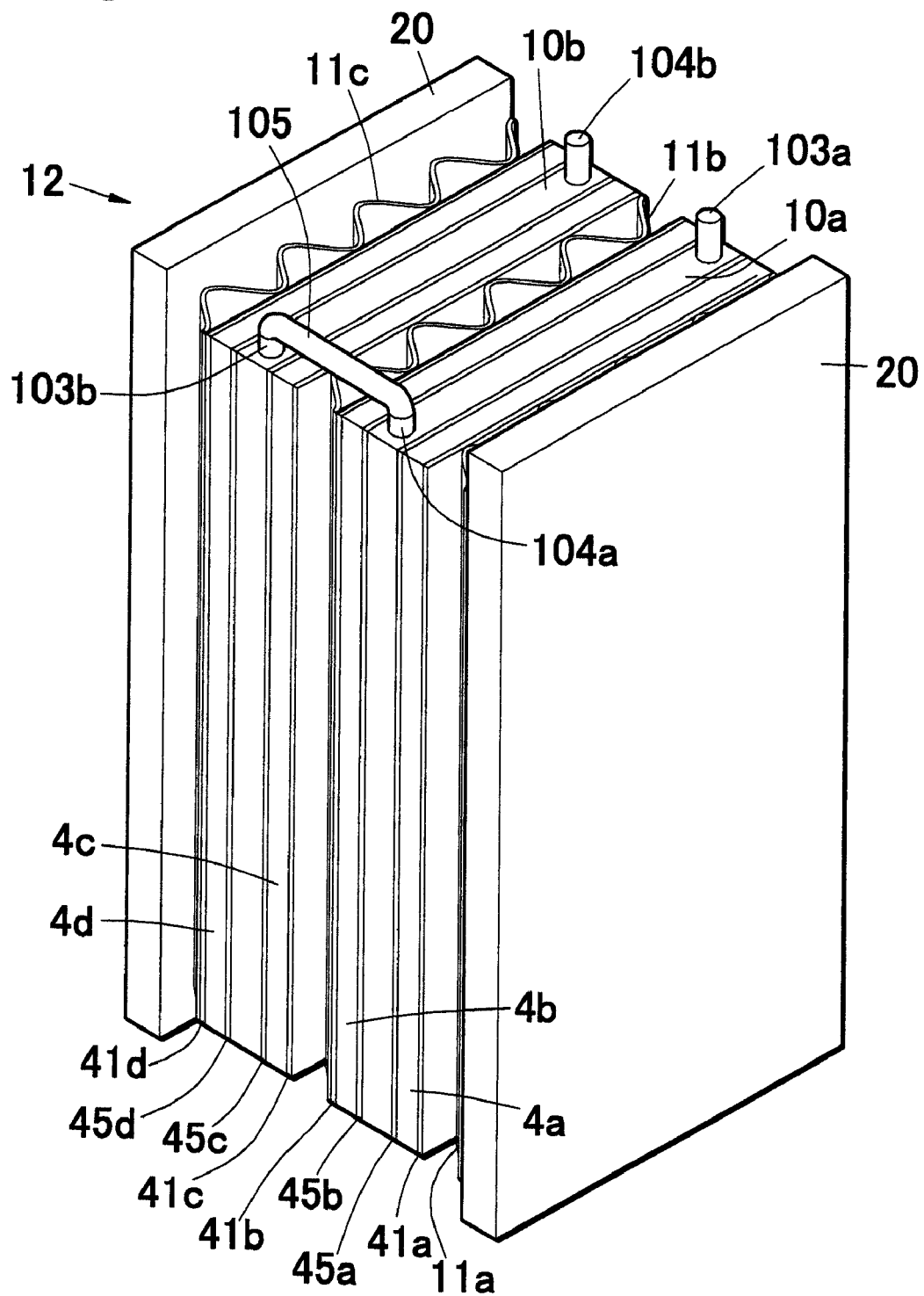
FIG. 8 is a perspective view showing the schematic structure of fuel cell bodies for use in the fuel cell system of FIG. 7.
Figure 9:
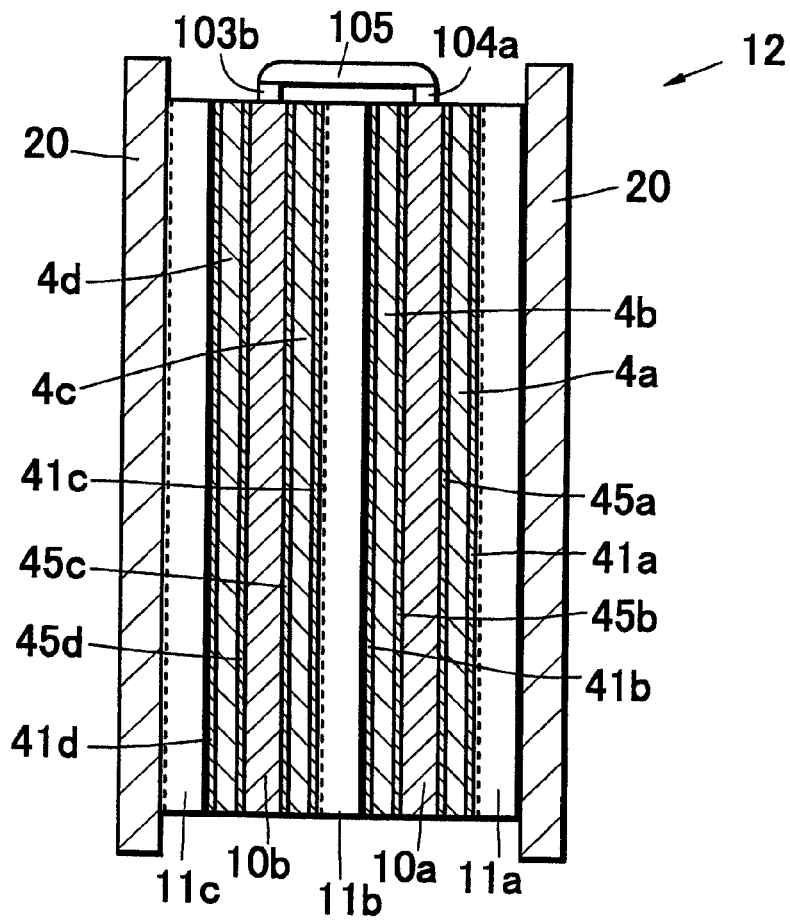
Figure 9:
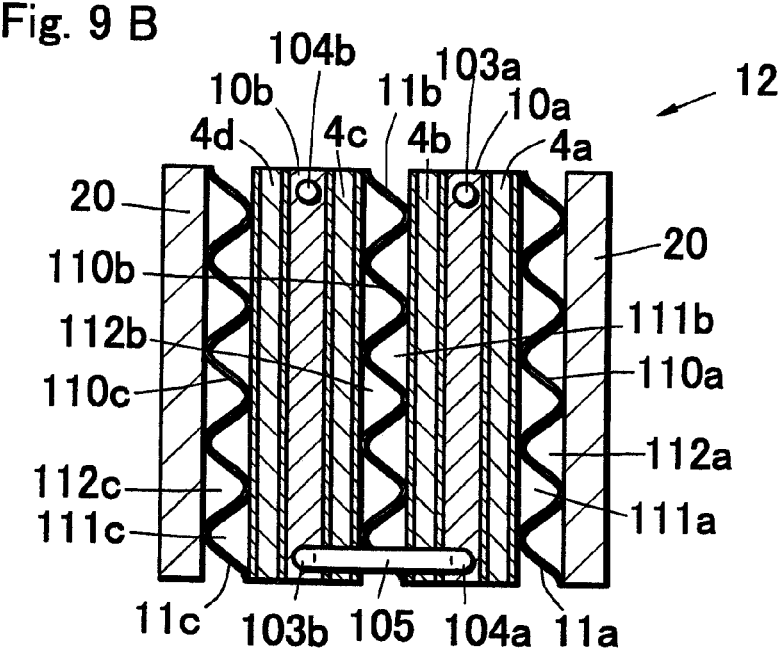

Herein, FIGS. 8, 9A and 9B show the detailed structure of the fuel cell body 12 for use in the second embodiment. As shown in FIGS. 8, 9A and 9B, the fuel cell body 12 has four membrane electrode assemblies, three anode-side separators and two cathode-side separators disposed in a specified disposition order, and is structured such that four fuel cell bodies are concatenated in close contact with each other in thickness direction. It is to be noted that in FIGS. 9A and 9B, hatching is applied to each component member as appropriate for clarifying the concatenated structure.

More specifically, as shown in FIGS. 8, 9A and 9B, a concatenated body structured so as to concatenate four fuel cell bodies is built in a housing 20 having no bottom wall nor top wall. The concatenated body is composed of, in the order from the right-hand side as viewed in FIG. 9A, a first anode-side separator 11a, an electrode-and-diffusion layer 41a, a first membrane electrode assembly 4a, an electrode-and-diffusion layer 45a, a first cathode-side separator 10a, an electrode-and-diffusion layer 45b, a second membrane electrode assembly 4b, an electrode-and-diffusion layer 41b, a second anode-side separator 11b, an electrode-and-diffusion layer 41c, a third membrane electrode assembly 4c, an electrode-and-diffusion layer 45c, a second cathode-side separator 10b, an electrode-and-diffusion layer 45d, a fourth membrane electrode assembly 4d, an electrode-and-diffusion layer 41d, and a third anode-side separator 11c, accumulated so that their main surfaces face each other.

More specifically, the fuel cell body is generally structured such that electrodes are disposed respectively on both sides of the membrane electrode assembly that is interposed between the anode-side separator and the cathode-side separator. Therefore, the fuel cell body 12 in the second embodiment is structured such that four independent membrane electrode assemblies 4a, 4b, 4c and 4d are disposed so that the same electrodes thereof face each other, and the anode-side separator and the cathode-side separator, which are essentially given to respective membrane electrode assemblies, are structured to be shared by adjacent two membrane electrode assemblies. Thus, sharing the anode-side separator and the cathode-side separator makes it possible to structure a small-size fuel cell concatenated-body 12.

Two cathode-side separators 10a, 10b are connected in series by a connection pipe 105, and an feed port 103a of the first cathode-side separator 10a is connected to the air feed pipe 73 so that air pumped in by the air pump 56 as shown by an arrow 92 travels through oxygen passageways formed by the surfaces of two cathode-side separators 10a, 10b, and the electrode-and-diffusion layers 45a to 45d and discharged to the outside of the housing 20 from a discharge port 104b as shown by an arrow 93.

Figure 10:
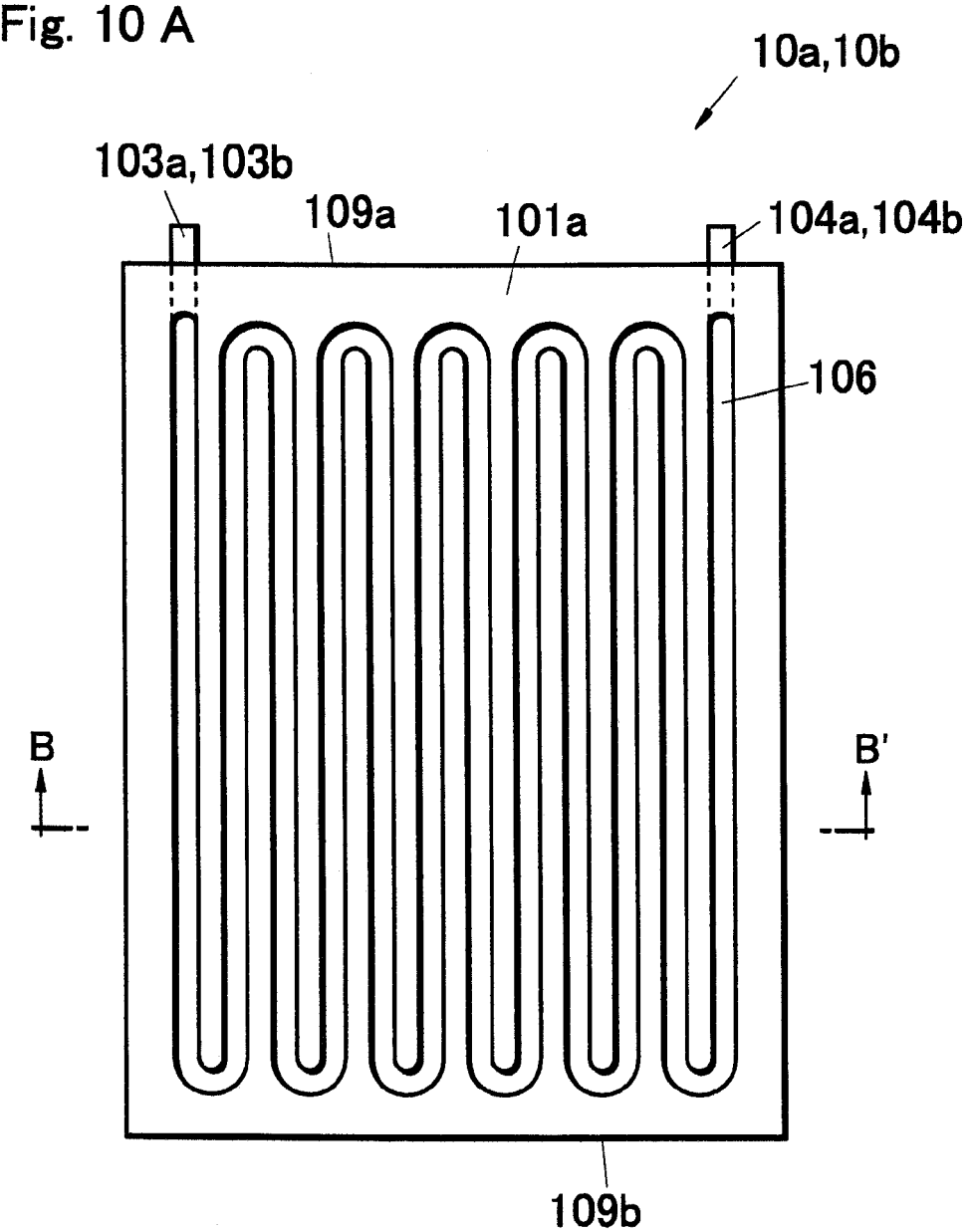
Figure 10:
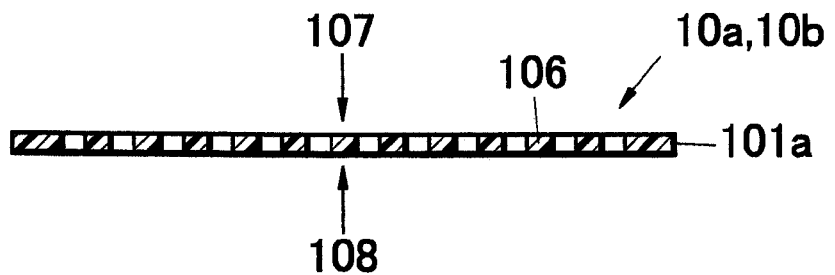

As shown in FIGS. 10A and 10B, the cathode-side separators 10a, 10b are composed of nonconductive resin plate bodies 101a which are flat in a thickness direction, and are provided with a slit-like hole 106 passing through both surfaces 107 and 108. Using resin as a material makes it possible to decrease the weight of the separator and facilitate molding thereof, thereby achieving mass production of a complicated groove shape. The slit-like hole 106, which stretches from the feed ports 103a, 103b to the discharge ports 104a, 104b provided on the front surface 109a, is in a meandering shape between the upper end and the lower end of the plate body and is shielded from the outside by the top surface 109a and the bottom surface 109b of the cathode-side separators 10a, 10b. This prevents foreign matter from getting into the oxygen passageway of the fuel cell concatenated-body except from the feed ports 103a, 103b and the discharge ports 104a, 104b.

By using the cathode-side separators 10a, 10b shown in FIGS. 10A and 10B, four electrode-and-diffusion layers 45a to 45d respectively in close contact with both surfaces 107, 108 come into contact with air traveling through the slit-like hole 106, thereby inducing a cathode reaction.

As shown in FIGS. 8, 9A and 9B, the anode-side separators 11a to 11c are composed of corrugated resin. Thus, using resin as a material makes it possible to decrease the weight of the separator and facilitate molding thereof, thereby achieving mass production of a complicated groove shape. The anode-side separators 11a to 11c may use respective separators for use in the first embodiment and its modified examples. However, as for the second anode-side separator 11b, both sides of which are in contact with the electrode-and-diffusion layers 41b and 41c on the side of the membrane electrode assemblies 4b and 4c, the fuel passageways 111b, 112b formed on both sides of the second anode-side separator 11b are both membrane electrode assembly-side fuel passageways. Therefore, the second anode-side separator 11b should preferably be structured so that both sides have the same volume. The first and third anode-side separator 11a and 11c positioned on both end sides may use the separators with a shape shown in FIG. 5A or 5B so that the volume of the membrane electrode assembly-side fuel passageways 111a, 111c that in contact with the electrode-and-diffusion layers 41a and 41d of the membrane electrode assemblies 4a, 4d is larger than that of the housing-side lines 112a, 112c.

In the case where the fuel cell concatenated-body 12 in the second embodiment is disposed in the direction shown in FIG. 8, the lower ends of the respective anode-side separators 11a to 11c serve as feed ports of the fuel passageways while the upper ends serve as discharge ports of the fuel passageways. More specifically, the entire fuel cell concatenated-body 12 is disposed so as to be immersed in the liquid fuel 55 reserved in the intermediate tank 54, and respective fuel passageways 111a to 111c, 112b are filled with liquid fuel. If power generation is started in this state, the liquid fuel filled in the fuel passageways 111a to 111c, 112b is reduced to carbon dioxide and proton by the anode reaction, and the carbon dioxide moves to the discharge port side. Consequently, the liquid fuel filled in the fuel passageways 111a to 111c, 112b rises and moves to the discharge port side, by which the liquid fuel 55 stored in the intermediate tank 54 goes into the fuel passageways from each feed port.

Thus, structuring the anode-side separators as described above makes it possible to feed liquid fuel to the anode side and let it flow at the time of power generation without the necessity of specific equipment. Therefore, the structure to feed liquid fuel to each anode of the fuel cell concatenated-body 12 that is composed of the four fuel cell bodies become unnecessary, which makes it possible to reduce increase in self power consumption associated with increase in output of the fuel cell concatenated-body 12. It is to be noted that also in the second embodiment, the feed port and the discharge port of the liquid fuel are relative and therefore both sides may be switched depending on the direction of the fuel cell body.

Herein, on behalf of the electrode-and-diffusion layers 45a, 45b, 45c, 45d disposed in between the respective cathode-side separators 10a, 10b and respective membrane electrode assemblies 4a, 4b, 4c, 4d, the electrode-and-diffusion layer 45a will be illustrated in FIG. 30, FIG. 31 and FIG. 32 showing the front view, the side view and the back view, respectively. It is to be noted that the electrode-and-diffusion layers 45a, 45b, 45c, 45d share the same structure and therefore the structure of the electrode-and-diffusion layer 45a will be described on behalf of those electrode-and-diffusion layers.

As shown in FIGS. 30, 31 and 32, the electrode-and-diffusion layer 45a has an electrode-and-diffusion layer portion 610a formed from, for example, carbon paper, and on the entire periphery of the 610a, there is disposed a packing 610b formed from, for example, a conductive rubber sheet. Thus, forming the entire outer periphery of the electrode-and-diffusion layer portion 610a from the packing 610b enables the respective cathode-side separators 10a and 10b to send out the oxygen introduced from the feed ports 103a, 103b to the discharge ports 104a, 104b without leaking the oxygen into the liquid fuel.

Contrary to such structure, the respective electrode-and-diffusion layers 41a, 41b, 41c and 41d disposed between the respective anode-side separators and the respective membrane electrode assemblies are formed from, for example, carbon paper, though a seal portion such as packing is not formed thereon.

Further, as for an output of each cell, since the cathode-side and anode-side separators are composed of nonconductive resin and therefore do not function as collectors, electric power is collected from the respective electrode-and-diffusion layers 41a to 41d, and 45a to 45d which are attached to both sides of the respective membrane electrode assemblies. In this case, each electrode should be connected without causing a short circuit. More precisely, there is a case of connecting four cells in series as shown in FIGS. 11A and 11B, and there is a case of connecting two parallel cells in series as shown in FIGS. 11C and 11D.

Figure 11:
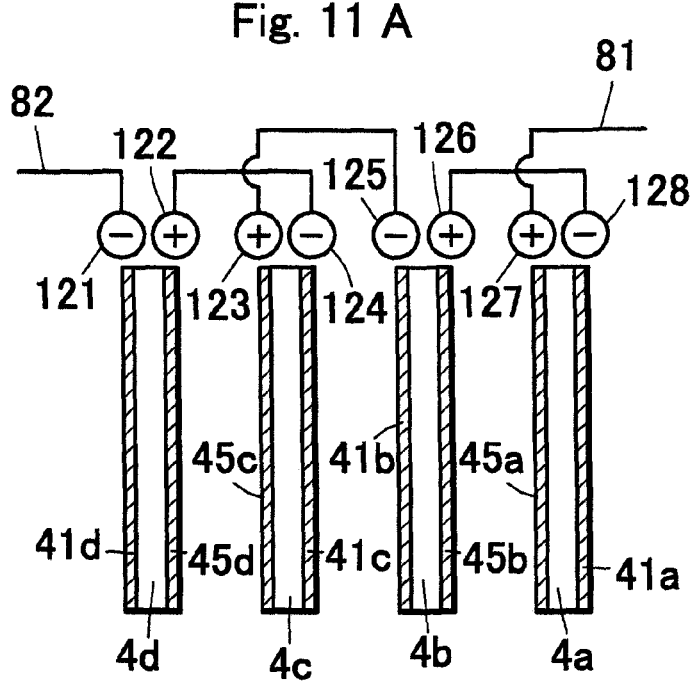
Figure 11:
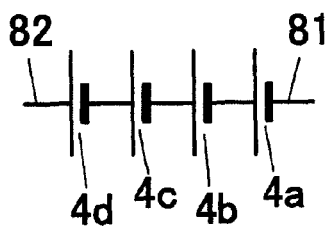
Figure 11:
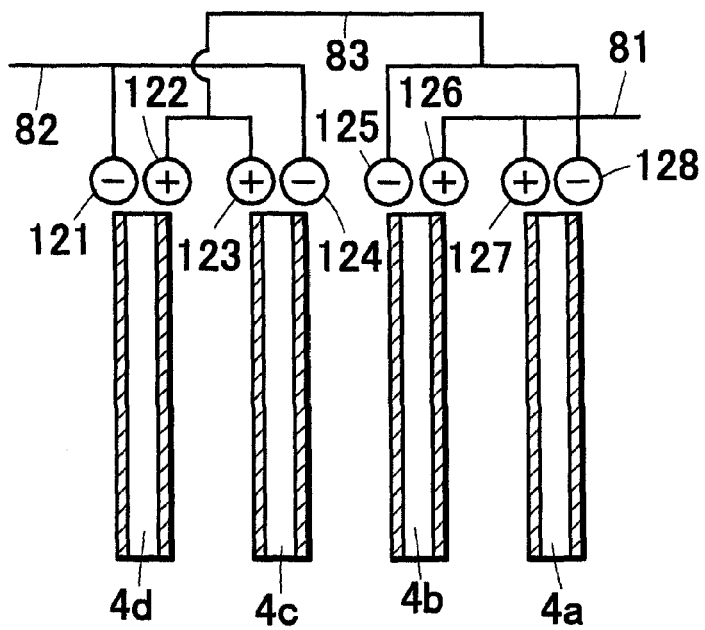
Figure 11:
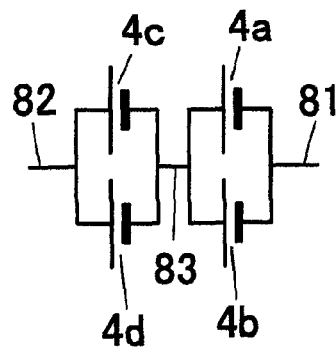

FIGS. 11A and 11B are wiring diagrams in the case where four separate fuel cell bodies in the fuel cell system are connected in series. FIGS. 11C and 11D are wiring diagrams in the case where two separate fuel cell bodies in the fuel cell system are connected in parallel and then they are connected in series. As described above, in the fuel cell concatenated-body 12 in the second embodiment, the fuel cell bodies are disposed so that the same electrodes thereof face each other. Consequently, as shown in FIGS. 11A to 11D, a positive electrode and a negative electrode are not disposed alternately, and therefore the interconnection shown in FIGS. 11A to 11D should be installed for connecting four fuel cell bodies.

More precisely, in the case where four cells are connected in series as shown in FIGS. 11A and 11B, available voltage becomes four times the voltage of each fuel cell body and therefore high output is achieved. However, there is a demerit in that if only one out of all the fuel cell bodies suffers voltage effect or becomes unusable, then the entire system is affected.

In the case where two parallel cells are further connected in series as shown in FIGS. 11C and 11D, there is a merit in that even if one of the fuel cell bodies suffers voltage effect or becomes unusable, the voltage is maintained Particularly, as described later, in the case where there is the possibility that the amount of liquid fuel flowing in the anode be changed and the voltage be dropped depending on the disposition direction of the fuel cell system, this way of connection is more preferable since the voltage drop can be taken care of.

Figure 12:
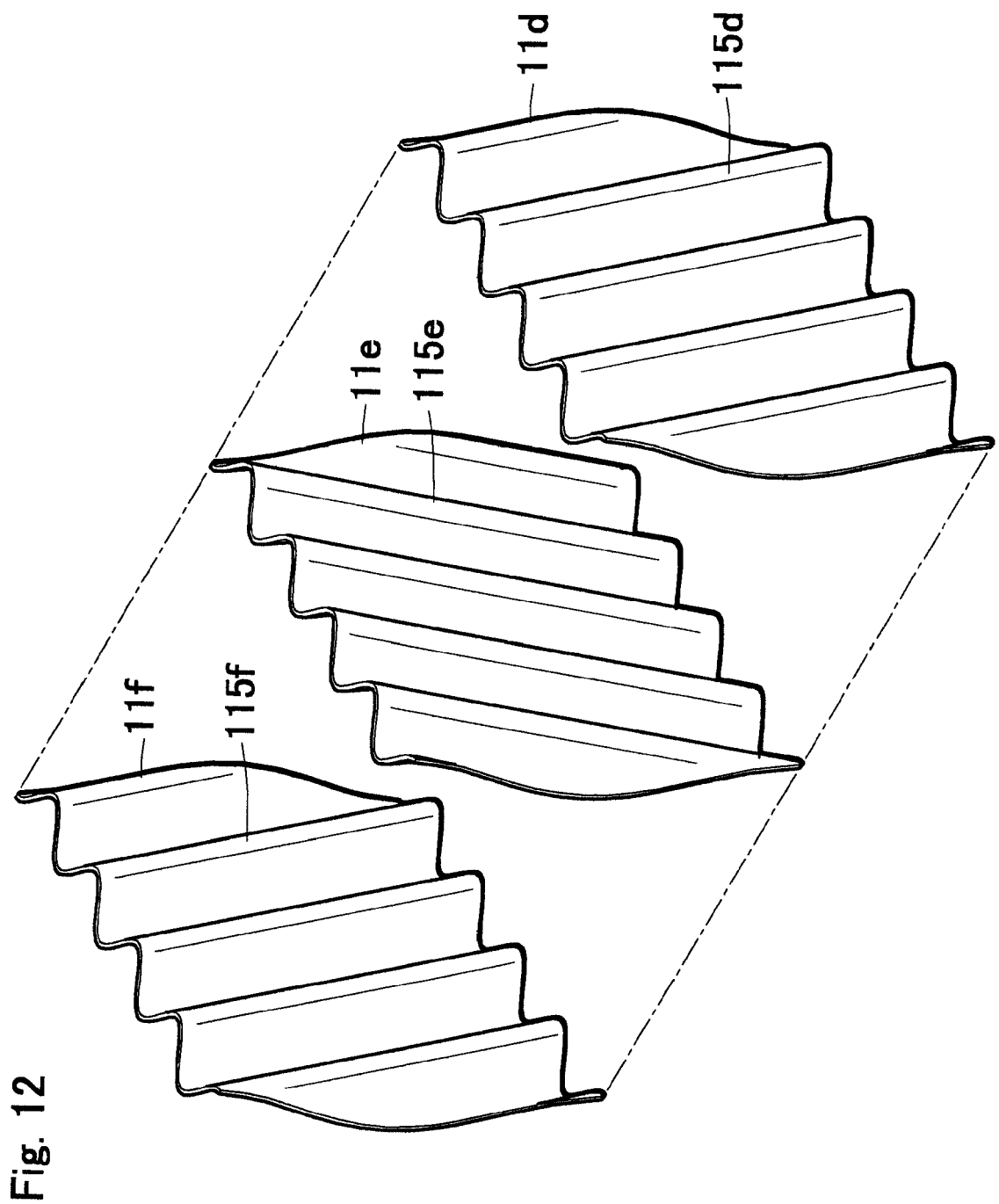
FIG. 12 is a view showing a modified example of anode-side separators for use in the fuel cell body of FIG. 8.

FIG. 12 is a view showing a modified example of the anode-side separators for use in the fuel cell body 12 of FIG. 8. Anode-side separators 11d to 11f shown in FIG. 12 share the same structure with the anode-side separator 11z shown in FIG. 6 except that they are built in the housing 20 so as to be disposed in alternated direction. More particularly, crest lines 115d, 115f and 115e in the waveform are disposed so as to be alternately inclined by an angle α or an angle −α from a line extending from the fuel feed port to the discharge port of the anode.

The above-described structure makes it possible to secure an amount of liquid fuel traveling through the fuel passageways in any one of the fuel cell bodies that constitute the fuel cell body 12 without relying on the disposition direction of the fuel cell concatenated-body 12, thereby enabling output decrease to be reduced smaller.

Third Embodiment

Figure 14:
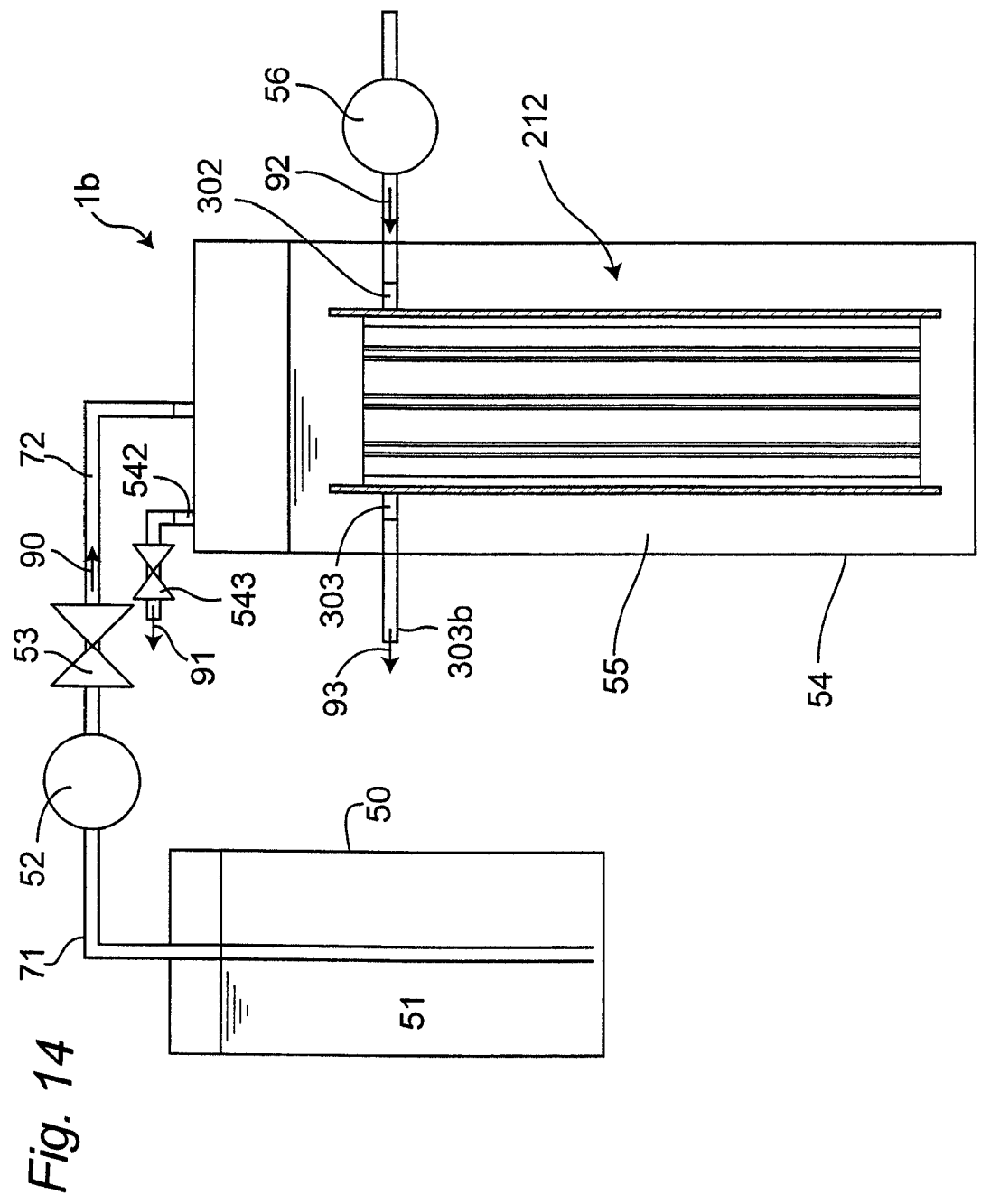
FIG. 14 is a schematic block diagram showing a fuel cell system in a third embodiment of the present invention.

A description is now given of a fuel cell system according to the third embodiment of the present invention. FIG. 14 is a schematic block diagram showing the fuel cell system in the third embodiment of the present invention. A fuel cell system 1b in the third embodiment is almost identical in structure to the fuel cell system 1 in the first embodiment, and therefore description herein will be focused on difference therebetween.

The fuel cell system 1b in the third embodiment is a fuel cell system with use of a Direct Methanol Fuel Cell (DMFC) which generates electric power by directly extracting protons from methanol. A fuel cell body 212 shares the structure of the fuel cell system 1 in the first embodiment.

As shown in FIG. 14, the entire fuel cell body 212 is disposed inside an intermediate tank 254 that is auxiliary equipment for fuel feed in the state of being completely immersed in liquid fuel 55 contained in the intermediate tank 254.

The side view, the front view and the top view showing the structure of the fuel cell body 212 for use in the third embodiment are shown in FIG. 15, FIG. 16 and FIG. 17, respectively. As shown in FIGS. 15, 16 and 17, the fuel cell body 212 has three membrane electrode assemblies, one anode-side separator, two anode-and-cathode-side separators, and one cathode-side separator disposed in a specified disposition order, and is structured such that three fuel cell bodies are concatenated in close contact with each other in thickness direction. The anode-and-cathode-side separator is a separator disposed so that its one surface faces to the anode side and the other surface faces to the cathode side.

More specifically, as shown in FIGS. 15 to 17, the concatenated body which is structured to have three concatenated fuel cell bodies disposed in between insulating members 301a and 301b made of, for example, resin is built in a housing 220 having no bottom wall nor top wall. The concatenated body is composed of, in the order from the right-hand side as viewed in FIG. 15, a cathode-side separator 210, an electrode-and-diffusion layer 241a, a first membrane electrode assembly 204a, an electrode-and-diffusion layer 245a, a first anode-and-cathode-side separator 211a, an electrode-and-diffusion layer 241b, a second membrane electrode assembly 204b, an electrode-and-diffusion layer 245b, a second anode-and-cathode-side separator 211b, an electrode-and-diffusion layer 241c, a third membrane electrode assembly 204c, an electrode-and-diffusion layer 245c, and an anode-side separator 213, disposed in close contact with each other. Different from the second embodiment in which respective anodes and cathodes are aligned so that the same electrodes thereof face each other, the third embodiment is structured such that different electrodes thereof are disposed facing each other so as to be electrically connected in series, and cells are concatenated such that the anodes and cathodes are alternatively disposed. It is to be noted that in FIGS. 15 to 17, reference numeral 302 is a feed port for feeding air (oxygen) to the cathode, and reference numeral 303 denotes a discharge port for discharging air. On both sides of the fuel cell concatenated-body 212, connection terminals 260 capable of outputting generated electric power are respectively provided.

The respective electrode-and-diffusion layers 241a, 245a, 241b, 245b, 241c and 245c included in the fuel cell concatenated-body 212 share the same structure. On behalf of these electrode-and-diffusion layers, the electrode-and-diffusion layer 241a will be illustrated in FIG. 27, FIG. 28 and FIG. 29 showing the front view, the side view and the back view, respectively.

As shown in FIGS. 27 to 29, the electrode-and-diffusion layer 241a is composed an electrode-and-diffusion layer portion 510a formed from, for example, carbon paper, and a packing 510b that is disposed on the periphery thereof and formed from, for example, a conductive rubber sheet. On the packing 510, there are formed a feed port 503 and a discharge port 504 as through holes for passing air. On the outer peripheral portion of each separator, a conductive material made of, for example, a carbon material is disposed. Consequently, if a primary portion of the separator is formed from a nonconductive material, series concatenation is achieved by using the outer peripheral portion. The structure of each separator will be described with reference to drawings.

Figure 19:
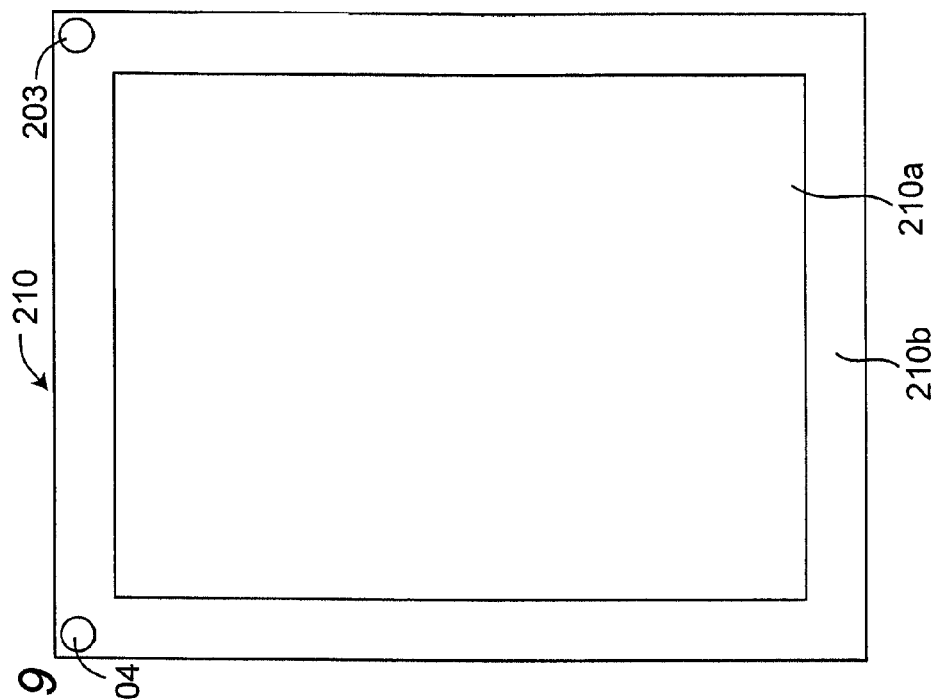
FIG. 19 is a back view showing the cathode-side separator of FIG. 18.
Figure 18:
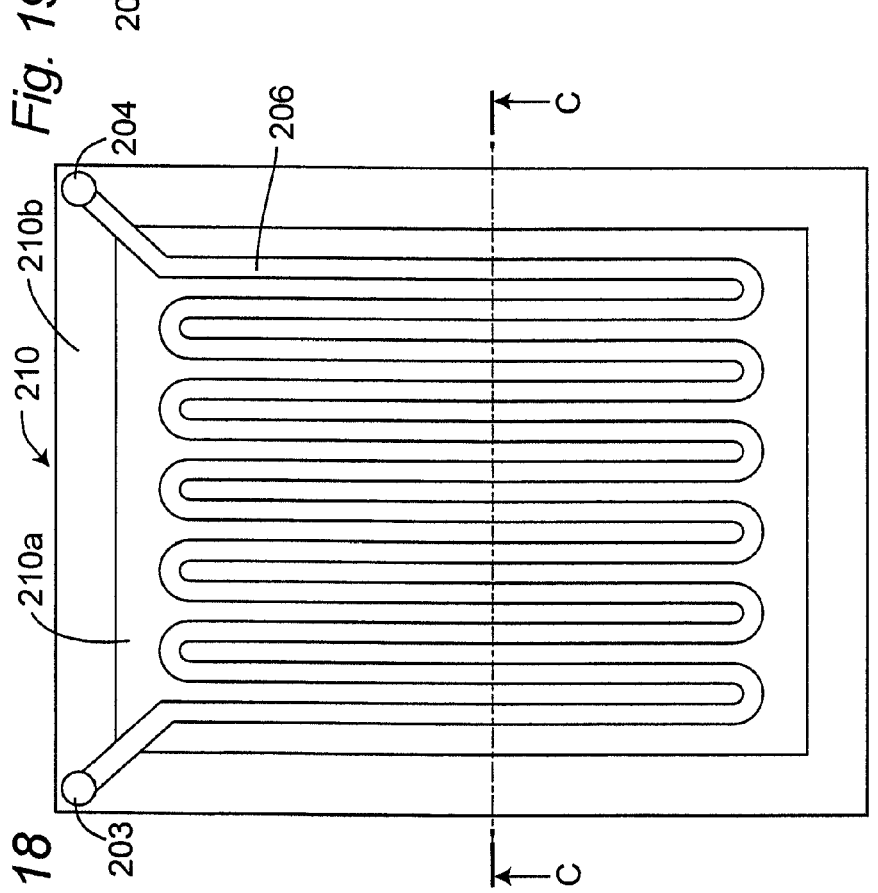
FIG. 18 is a front view showing the structure of a cathode-side separator in the fuel cell body of FIG. 15.
Figure 20:
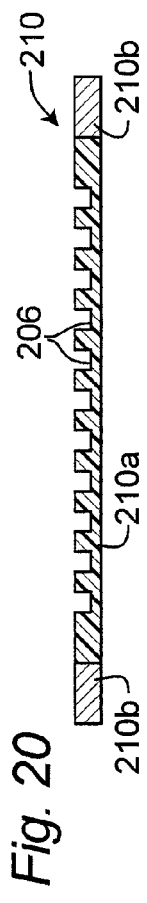
FIG. 20 is a cross sectional view showing the cathode-side separator taken in line C-C' of FIG. 18.

First, the front view of the cathode-side separator 210 is shown in FIG. 18, the back view thereof is shown in FIG. 19, and the cross sectional view of the separator 210 taken in line C-C' of FIG. 18 is shown in FIG. 20. As shown in FIGS. 18 to 20, the cathode-side separator 210 is composed of a nonconductive resin plate body 210a which is flat in its thickness direction, and on the entire outer periphery, there is provided a conductive portion 210b formed from, for example, a carbon material exemplifying the conductive material.

Further, as shown in FIG. 18, a groove 206 constituting an oxygen passageway is formed on the surface on the front side of the cathode-side separator 210. The groove 206, which is formed so as to continuously stretch from the feed port 203 to the discharge port 204 provided as through holes on the same surface, is in a meandering shape between the upper end and the lower end of the plate body 210a. Moreover, air (oxygen) introduced to the groove 206 can be shielded against liquid fuel by the packing 510b such as the electrode-and-diffusion layer 241a. Therefore, the oxygen passageway of the fuel cell concatenated-body 212 is structured so as to prevent foreign matter (particles) from getting inside except from the feed port 203 and the discharge port 204. It is to be noted that as shown in FIG. 19, the back-side surface of the cathode-side separator 210 serves as an end portion that is coupled with the insulating member 301a, and therefore a groove is not formed thereon.

Next, since the first anode-and-cathode-side separator 211a and the second anode-and-cathode-side separator 211b share the same structure, on behalf of these two separators, the first anode-and-cathode-side separator 211a will be illustrated in FIG. 21, FIG. 22 and FIG. 23 showing the front view, the back view, and the cross sectional view of the separator taken in line D-D' of FIG. 21, respectively.

The first anode-and-cathode-side separator 211a is formed as a nonconductive resin plate body 310a which is flat in its thickness direction, and on the entire outer periphery, there is provided a conductive portion 310b formed from, for example, a carbon material exemplifying the conductive material. Further in the first anode-and-cathode-side separator 211a, the surface on the side shown in FIG. 21 has a function as a cathode-side separator, while the surface on the side shown in FIG. 22 has a function as an anode-side separator.

Further, on the surface shown in FIG. 21, a groove constituting an oxygen passageway is formed. The groove 306 as an oxygen passageway, which is formed so as to continuously stretch from the feed port 303 to the discharge port 304 provided on the same surface, is in a meandering shape between the upper end and the lower end of the plate body 310a.

Further, on the surface shown in FIG. 22, a plurality of vertical grooves 307 formed so as to extend in the vertical direction in the drawing are aligned, and these vertical grooves 307 can constitute fuel passageways. Thus-formed respective vertical grooves 307 enable liquid fuel to be introduced into respective vertical grooves 307, i.e., fuel passageways, from the end portion of the first anode-and-cathode-side separator 211a. It is to be noted that the shape shown in FIG. 5B is adopted as the shape of the vertical grooves 307.

Further, the feed port 305 and the discharge port 304 formed on the conductive portion 310b of the first anode-and-cathode-side separator 211a are formed so as not to connect to the vertical grooves 307 formed on the side of the surface shown in FIG. 22, and they are disposed so as to align with the feed port 203 and the discharge port 204 of the cathode-side separator 210.

Further, the front view showing the structure of the anode-side separator for use in the anode is shown in FIG. 24, the back view thereof is shown in FIG. 25, and the cross sectional view of the anode-side separator taken in line E-E' of FIG. 24 is shown in FIG. 26.

As shown in FIGS. 24 to 26, the anode-side separator 213 is composed of a thin plate-shaped body 410a made of a nonconductive material such as resin and a conductive portion 410b formed from, for example, a carbon material exemplifying the conductive material disposed on the outer periphery portion. Further, on the side of the surface shown in FIG. 24, the anode-side separator 213 is composed of an aligned plurality of vertical grooves 406 formed so as to extend in vertical direction in the drawing as fuel passageways. The anode-side separator 213 enables all the liquid fuel fed to the anode to come into contact with the membrane electrode assembly 204c through the anode-and-cathode-side separator 245a. Moreover, as shown in FIGS. 24 and 25, at both corner portions on the conductive portion 410b, through holes 403, 404, are formed so as not to connect to the vertical grooves 406 that are formed on the side of the surface shown in FIG. 24, and are formed so as to align with the feed port 203 and the discharge port 204 of the cathode-side separator 210. It is to be noted that as shown in FIG. 25, the back-side surface of the anode-side separator 213 serves as an end portion that is coupled with the insulating member 301b, and therefore grooves are not formed thereon.

Structuring the respective separators and the anode-and-cathode-side separators as described above makes it possible to form the fuel cell concatenated-body 212 as shown in FIG. 15. In thus-formed fuel cell concatenated-body 212, the positions of the feed port 203 and the discharge port 204 of the anode-side separator 210, the positions of the feed port 305 and the discharge port 304 of the anode-and-cathode-side separators 211a, 211b, and the positions of the through holes 403 and 404 of the cathode-side separator 213 are set to align with each other. This makes it possible to connect the feed ports and the discharge ports of adjacent cathodes, and also makes it possible to connect the respective feed ports and discharge ports to one feed port 302 and one discharge port 303 provided on the outside of the fuel cell concatenated-body 212.

Further, as shown in FIG. 14, a feed port 302 provided on the outside of the fuel cell concatenated-body 212 is connected to the air pump 56 provided on the outside of the intermediate tank 54 through an air feed pipe, while a discharge port 303 is connected to a discharge port 303b provided on the outside of the intermediate tank 54 through an air discharge pipe. With such structure, in FIG. 14, air pumped into the fuel cell concatenated-body 212 by driving of the air pump 56 through the air feed pipe and the feed port 302 as shown by an arrow 92 is fed to the oxygen passageway formed by the groove 206 of the cathode-side separator 210 and the surface of the electrode-and-diffusion layer 241a and to the oxygen passageways formed by the groove 306 of the first and second anode-and-cathode-side separators 211a, 211b and the surfaces of the electrode-and-diffusion layers 241b, 241c, and surplus air that has passed the oxygen passageways is discharged to the outside of the fuel cell concatenated-body 212 through the discharge ports 303 and 303b as shown by an arrow 93.

Further in the fuel cell concatenated-body 212, the liquid fuel 55 contained in the intermediate tank 54 can be fed to fuel passageways formed by the vertical grooves 307 of the first and second anode-and-cathode-side separators 211a, 211b and the surfaces of the electrode-and-diffusion layers 245a, 245b, as well as to fuel passageways formed by the vertical grooves 406 of the anode-side separator 213 and the surface of the electrode-and-diffusion layers 245c. For example, in the case where the fuel cell concatenated-body 212 is positioned in the intermediate tank 54 as shown in FIG. 14, the end portions of the respective fuel passageways positioned on the lower end of the drawing in the fuel cell concatenated-body 212 function as feed ports of the liquid fuel, while the end portions on the upper end side function as discharge ports.

More specifically, the fuel cell concatenated-body 212 is disposed so as to be completely immersed in the liquid fuel 55 contained in the intermediate tank 54, and the vertical grooves 307, 406 forming the respective fuel passageways are in the state of being filled with liquid fuel. If power generation is started in the fuel cell concatenated-body 212 in this state, the liquid fuel filled in the respective vertical grooves 307, 406 is reduced to carbon dioxide and proton by an anode reaction, and the carbon dioxide moves to the discharge port side. Consequently, the liquid fuel filled in the respective vertical grooves 307, 406 rises and moves to the discharge port side, by which the liquid fuel 55 contained in the intermediate tank 54 are fed to the respective fuel passageways from each feed port.

Thus, structuring the anode-side separators as described above makes it possible to feed liquid fuel to the anode side and let it flow at the time of power generation without the necessity of specific equipment. Therefore, the structure to feed liquid fuel to each anode of the fuel cell concatenated-body that is composed of three fuel cell bodies becomes unnecessary, which makes it possible to an reduce increase in self power consumption associated with an increase in output of the fuel cell concatenated-body. It is to be noted that also in the third embodiment, the feed port and the discharge port of the liquid fuel are relative and therefore both sides may be switched depending on the disposition direction of the fuel cell body.

Although in the third embodiment, there has been shown an example in which a conductive rubber sheet material is used as a material of the packing 510b disposed on the periphery of the anode-and-cathode-side separator 510, a nonconductive material is also applicable as the material. An adherent sealing compound and a liquid heat curing sealing compound are also applicable.

Further, since the conductive portions 210b, 310b and 410b having conductivity are formed on the outer peripheral portions of the respective separators, the respective fuel cell bodies can be concatenated in series with use of the respective conductive outer peripheral portions even if the main portion of each separator is formed from a nonconductive material. Therefore, without the necessity of installing external interconnection (such as wiring) for concatenation on the outside of the fuel cell concatenated-body 212, the fuel cell concatenated-body can be structured such that fuel cell bodies are concatenated with different electrodes being disposed facing each other so that an anode and a cathode are disposed alternatively. This makes it possible to increase the degree of freedom in concatenation while a simple structure is maintained.

It is to be noted that in the fuel cell concatenated-body 12 of the second embodiment and the fuel cell concatenated-body 212 of the third embodiment, the housings 20, 220 may be fastened with use of bolts and plates to strengthen the contact with the respective fuel cell bodies.

Figure 13:
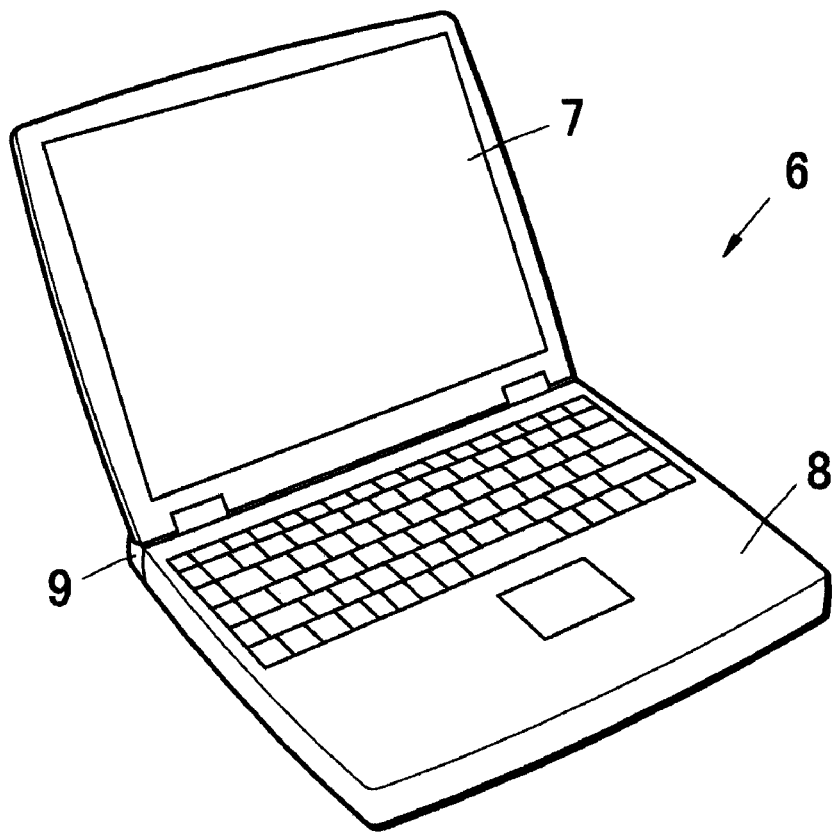
Figure 13:
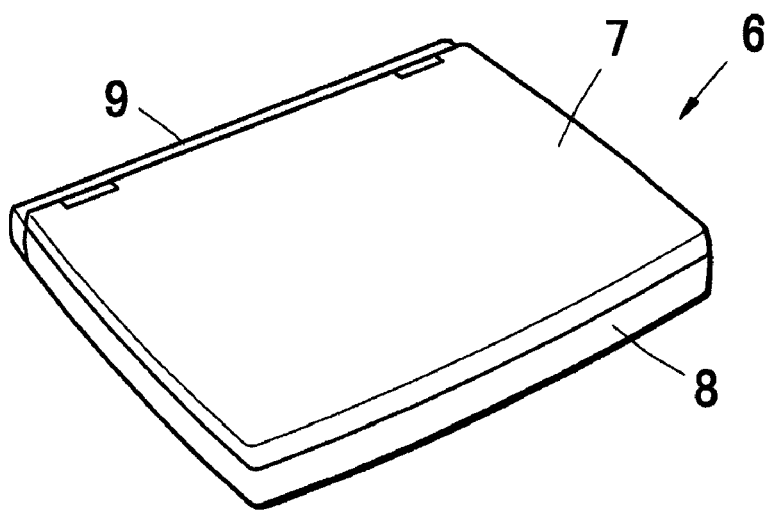

Moreover, since the fuel cell systems 1, 1a and 1b in the first embodiment, the second embodiment and the third embodiment are small size and are almost free from external discharge of moisture, they can preferably be applied to portable electronic equipment. FIGS. 13A and 13B are schematic perspective views showing the fuel cell system shown in FIG. 1, 7 or 14 applied as a cell of notebook-sized personal computers in the form of a fuel cell pack. As shown in FIGS. 13A and 13B, the fuel cell systems 1, 1a and 1b can be structured to be small so that with use of these systems, a fuel cell pack 9 for notebook-sized personal computers is constructed. Even in the case where the fuel cell pack 9 is attached to a mainframe 6 of a notebook-sized personal computer, the fuel cell pack 9 can preferably be used without obstructing the portable purpose.

Although carbon paper is used as the anode-and-cathode-side separator in the above embodiment, other materials are also applicable. For example, foam metal made of stainless materials may also be used.

Although in the fuel cell system of FIG. 7, two cathode-side separators are concatenated and introduction and discharge of air to the cathodes are structured to be implemented by one port each, the present invention is not limited thereto and therefore air may be structured to be introduced to and discharged from each cathode-side separator separately.

Further, for example, in the case where grooves extending linearly with a specified inclination from the top end to the lower end are provided on both sides of the anode-side separator 11b for use in the fuel cell system of FIG. 7 to form fuel passageways on both sides, it becomes possible to alternatively change the inclination direction of the grooves on the front side and the back side. Such structure allows application of separators other than those in a corrugated shape to the fuel cell system of FIG. 7, which makes it possible to secure a flow rate of the liquid fuel at least in one fuel cell body without relying on the disposition direction of the fuel cell concatenated-body.

Next, a further embodiment of the fuel cell system according to the present invention will be described in detail with reference to the drawings.

Fourth Embodiment

Figure 33:
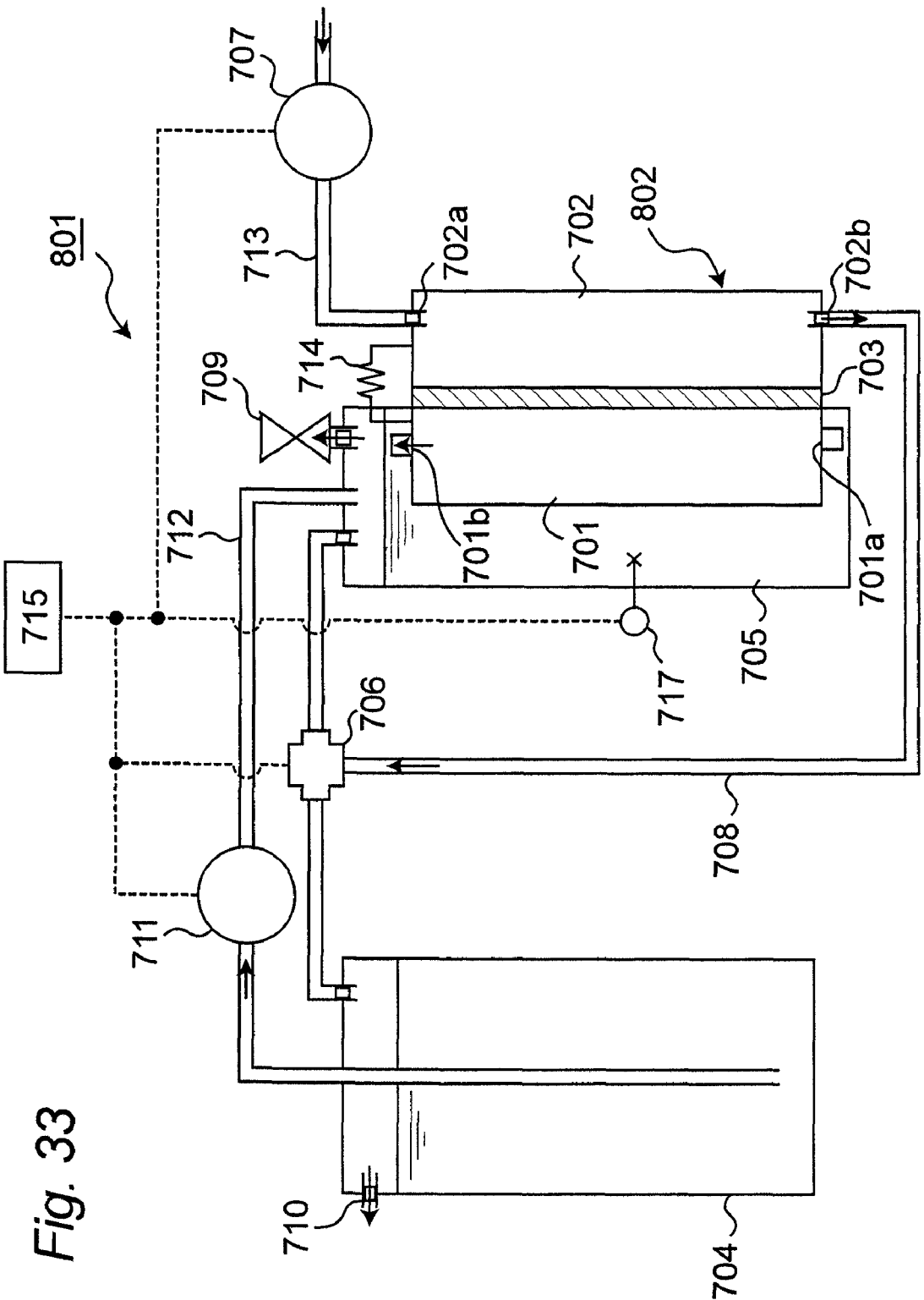
FIG. 33 is a schematic structural view showing a fuel cell system in a fourth embodiment of the present invention.

A schematic structural view showing the schematic structure of a fuel cell system 801 according to the fourth embodiment of the present invention is shown in FIG. 33. It is to be noted that the fuel cell system 801 of the fourth embodiment is different from the fuel cell system of the first embodiment in the point that simplification and downsizing of the structure including auxiliary equipment system in the fuel cell system are pursued by highlighting the feed of liquid fuel to the fuel cell body and the collection of products produced in the fuel cell body, and therefore description hereinafter will be focused on the structural difference.

As shown in FIG. 33, the fuel cell system 801 has a fuel cell body 802 that is a power generation portion for generating electric power by electrochemically converting chemical energy of fuel to electric energy, and an auxiliary equipment system for operation such as feeding fuel or the like necessary for the power generation to the fuel cell body 802. Moreover, the fuel cell system 801 is a Direct Methanol Fuel Cell (DMFC) for generating electric power with use of a methanol solution exemplifying organic liquid fuel as fuel by directly extracting protons from the methanol.

As shown in FIG. 33, the fuel cell body 802 has an anode (fuel pole) 701, a cathode (air pole) 702 and a membrane electrode assembly 703. The anode 701 has a function to oxidize fed methanol and perform a reaction to extract protons and electrons (anode reaction).

The electrons move to the cathode 702 through a power generation circuit 714 that is an external circuit which electrically connects the anode 701 and the cathode 702, whereas the protons move to the cathode 702 through the membrane electrode assembly 703. The cathode 702 has a function to perform a reaction (cathode reaction) to produce water through a reduction reaction with use of the oxygen fed from the outside, the protons moved from the anode 701 through the membrane electrode assembly 703, and the electrons flowing in through the outside circuit. Thus, an oxidative reaction in the anode 701 and a reduction reaction in the cathode 702 are respectively performed and electrons are sent through the power generation circuit 714, so that current is generated to allow power generation.

More specifically, in the fuel cell body 802, for example, a membrane electrode assembly is formed by forming carbon powder carriers with platinum and ruthenium, or an alloy of platinum and ruthenium being dispersed therein as an anode catalyst of the anode 701 on one surface of an electrolyte formed from a Nafion 117 (trade name) made by DuPont, while forming carbon carriers with platinum particles being dispersed therein as a cathode catalyst of the cathode 702 on the other surface, placing diffusion layers made of, for example, carbon paper respectively on the anode catalyst and the cathode catalyst so as to be in intimate contact, and then fixing the electrolyte to a housing through an separator.

Further, as shown in FIG. 33, the anode 701 has a fuel feed port 701a for feeding a methanol solution inside so as to allow the anode reaction and a discharge port 701a for discharging carbon dioxide produced by the anode reaction and a remaining methanol solution not used in the reaction from the inside.

The cathode 702 has, for feeding oxygen for use in the cathode reaction with use of, for example, air, an air feed port 702a for feeding the air to the inside of the cathode 702, and a discharge port 702b for discharging water (including water in both liquid phase or gas phase, and water in the mixed state of both phases) that exemplifies the product produced by the cathode reaction from the inside. It is to be noted that the product contains water as a primary ingredient, and may contain other ingredients such as formic acid, methyl formate and methanol (by later-described cross over).

A description is now given of the structure of the auxiliary equipment system in the fuel cell system 801. The auxiliary equipment system has auxiliary equipment for feeding a methanol solution to the anode 701 of the fuel cell body 802, auxiliary equipment for feeding air to the cathode 702, and auxiliary equipment for collecting water, i.e., a product produced in the cathode 702.

First, as shown in FIG. 33, the auxiliary equipment for the fuel feed has an intermediate tank 705 exemplifying the first fuel container for containing a methanol solution as liquid fuel so as to be fed to the anode 701, a liquid concentrate tank 704 exemplifying the second fuel container for containing a methanol solution with a concentration higher than that of the methanol solution contained in the intermediate tank 705 as liquid fuel concentrate so as to be fed to the intermediate tank 705, a fuel pump 711 exemplifying the liquid concentrate feed unit for feeding the liquid fuel concentrate contained in the liquid concentrate tank 704 to the intermediate tank 705, and a liquid concentrate feed pipe 712 exemplifying the liquid fuel concentrate feed passageway having the fuel pump 711 at some midpoint and connecting the liquid concentrate tank 704 and the intermediate tank 705.

The intermediate tank 705 is structured integrally with the fuel cell body 802, and the anode 701 is disposed in the inner space of the intermediate tank 705, so that the anode 701 is completely immersed in the liquid fuel contained in a fill-up state. Thus, disposing the anode 701 in the intermediate tank 705 makes it possible to feed the liquid fuel into the anode 701 through the fuel feed port 701a that is constantly in the state of being immersed in the liquid fuel. Although in FIG. 33, the entire anode 701 is immersed in the liquid fuel, only a part of the anode 701 may be immersed in the liquid fuel instead. In such a case, still at least the fuel feed port 701a and the discharge port 701b need to be immersed in the liquid fuel. Further, instead of forming the intermediate tank 705 integrally with the fuel cell body 802, both units may be formed separately. In such a case, a feed unit for feeding liquid fuel from the intermediate tank 705 to the anode 701 may be provided where necessary.

Further, gases such as carbon dioxide produced in the anode reaction performed in the anode 701 flow into the intermediate tank 705 through the discharge port 701b of the anode 701. In order to discharge the gases flowing into in this manner to the outside of the intermediate tank 705, there is provided an exhaust valve 709. It is to be noted that the exhaust valve 709 may function as a gas vent during initial injection of liquid fuel to the intermediate tank 705. Further, the intermediate tank 705 is equipped with a concentration sensor 717 exemplifying the concentration detector capable of detecting the concentration of liquid fuel contained therein. It is to be noted that the concentration sensor 717 may use ultrasonic or near-infrared multiwavelength optical concentration sensors.

The liquid concentrate tank 704, which contains liquid fuel concentrate, is disposed such that one end of the liquid concentrate feed pipe 712 is positioned in the vicinity of the bottom portion of the liquid concentrate tank 704, by which the liquid fuel concentrate contained therein is pumped up through the liquid concentrate feed pipe 712 by the fuel pump 711. Moreover, the liquid concentrate tank 704 is provided with an air discharge port 710 composed of, for example, a gas-liquid separation membrane for discharging air in the tank. It is to be noted that the air discharge port may be equipped with an exhaust valve.

From the view point that, for example, the fuel pump should be a small-size pump with small power consumption and that controlling the drive time of the fuel pump should enable a feed amount of the liquid fuel concentrate to be controlled, a small-size positive displacement pump or the like should preferably be used as the fuel pump 711. In the first embodiment, for example, a solenoid-operated pump is used (a check valve incorporated, discharge rate: 0-4 ml/min., discharge pressure: 10 kPa), which in use can be, for example, intermittently driven to send out an appropriate amount of liquid fuel concentrate. Moreover, the end portion on the feed side of the liquid concentrate feed pipe 712 is connected to the intermediate tank 705, so that as the fuel pump 711 is driven, liquid fuel concentrate may be fed to the intermediate tank 705 through the liquid concentrate feed pipe 712.

Further, the intermediate tank 705 contains, as the liquid fuel, a methanol solution in the concentration range of, at percent by weight, 1 to 10 wt %, preferably in the range of 3 to 10 wt %. In the initial state, the intermediate tank 705 contains methanol solution with a concentration of 6.5 wt %. A liquid concentrate tank 704 contains a methanol solution higher in concentration than the liquid fuel contained in the intermediate tank 705 or methanol concentrate (i.e., methanol with a concentration of 100 wt %). In the initial state, for example, the liquid concentrate tank 704 contains a methanol solution with a concentration of 68 wt %.

Next, the auxiliary equipment for air feed has an air feed pipe 713 exemplifying the air feed passageway whose one end is connected to the air feed port 702*a* of the cathode 702, and an air pump 707 exemplifying the oxygen feed unit (or exemplifying the air feed pump) disposed at some midpoint of the air feed pipe 713 for feeding air into the cathode 702 through the air feed pipe 713. As the air pump 707, a small-size pump with small concentration should be preferably used. For example, a motor operated pump is used (a check valve incorporated, discharge rate: 0-21/min., discharge pressure: 30 kPa), which in use feeds air at, for example, 1 L/min. Moreover, when power generation is executed in the fuel cell body 802, the air pump 707 is driven to feed necessary oxygen into the cathode 702, while when the power generation is stopped, the air pump 707 is stopped driving. It is noted that when the power generation is stopped, the fuel pump 711 is also stopped driving.

Further, the auxiliary equipment for water collection has a water collection pipe line 708 exemplifying the product collection passageway for connecting the discharge port 702*b* of the cathode 702, the intermediate tank 705 and the liquid concentrate tank 704 so that water produced in the cathode 702 is fed and collected into the intermediate tank 705 or the liquid concentrate tank 704 for, and a three-way valve (cross valve or three-way control valve) 706 exemplifying the collection amount regulator disposed at a bifurcation point to a pipe line to the intermediate tank 705 and to a pipe line to the liquid concentrate tank 704, located at some midpoint of the water collection pipe line 708.

The three-way valve 706 has a function to regulate a collection amount (feed amount) of water which flows from the cathode 702 to the water collection pipe line 708 and is collected into the intermediate tank 705, and a collection amount (feed amount) of the water which is collected into the liquid concentrate tank 704 through regulation of its opening. For example, all the water can be fed only to the intermediate tank 705 or to the liquid concentrate tank 704, or a part of the water can be fed to the intermediate tank 705 while the remaining water can be fed to the liquid concentrate tank 704.

Such flow of water through the water collection pipe line 708 is generated such that the water produced within the cathode 702 is sent to the water collection pipe line 708 through the discharge port 702*b* by the pressure applied to the inside of the cathode 702 by driving of the air pump 707. In other words, the air pump 707 can introduce air into the cathode 702 with a pressure capable of feeding the water to the intermediate tank 705 and the liquid concentrate tank 704 through the water collection pipe line 708 (i.e., the air pump 707 has such discharge pressure).

Next, thus-structured fuel cell system 801 is equipped with a control unit 715 for controlling the operation of respective units and component members. The control unit 715 is capable of controlling various operations in the fuel cell system 801 in a comprehensive manner while associating the respective operations to each other, the operations including the operation to feed liquid fuel concentrate by the fuel pump 711, the operation to feed air by the air pump 707, and the operation to regulate the opening of the three-way valve 706.

More precisely, the control unit 715 controls so as to drive the air pump 707 when power generation is executed in the fuel cell body 802 and to stop driving of the air pump 707 when the power generation is stopped. Moreover, the control unit 715 also controls so as to stop driving of the fuel pump 711 at the same time as the air pump 707 is stopped driving.

Further, the control unit 715 is capable of controlling a feed amount of liquid fuel concentrate to the intermediate tank 705 and a collection amount of water collected depending on the concentration of liquid fuel contained in the intermediate tank 705 detected by the concentration sensor 717. More specifically, the driving time of the fuel pump 711 and the opening position of the three-way valve 706 can be controlled depending on the detected concentration so that the liquid fuel contained in the intermediate tank 705 is maintained in a specified concentration range which is pre-determined in the control unit 715. The concentration range pre-determined in the control unit 715 herein refers to the concentration range of the methanol solution which allows generation of necessary electricity (necessary voltage and current) in the fuel cell body 802, which is set, for example, in the concentration range of 10 wt % to 1 wt %, more preferably 10 wt % to 3 wt %.

A description is now given of the operation of respective units and component members when power generation is executed in thus-structured fuel cell system 801. It is to be noted that the operation control over respective units and component members described hereinafter is performed by the control unit 715 in a comprehensive manner while the respective operations is associated to each other.

First, in the fuel cell system 801 shown in FIG. 33, a methanol solution (liquid fuel) with a concentration of, for example, 6.5 wt % is contained in the intermediate tank 705, while a methanol solution (liquid fuel concentrate) with a concentration of, for example, 68 wt % is contained in the liquid concentrate tank 704. The liquid fuel contained in the intermediate tank 705 is fed to the anode 701 through the fuel feed port 701*a*.

After that, the air pump 707 is driven, and air, i.e., oxygen, is fed through the air feed pipe line 713 and the air feed port 702*a*. By this, an anode reaction is performed in the anode 701, while a cathode reaction is performed in the cathode 702. Consequently, electricity is generated between the anode 701 and the cathode 702 or in the power generation circuit 714. Carbon dioxide generated by the anode reaction in the anode 701 goes into the intermediate tank 705 through the discharge port 701b, and further goes through the exhaust valve 709 of the intermediate tank 705 before discharged out of the intermediate tank 705.

Water generated by the cathode reaction in the cathode 702 is sent to the water collection pipe line 708 through the discharge port 702b by the pressure applied to the inside of the cathode 702 by the air pump 707. The water that has been sent out travels through the water collection pipe line 708 and is fed and collected into the intermediate tank 705 or the liquid concentrate tank 704 by the three-way valve 706.

By execution of the power generation, methanol and water from the methanol solution contained in the intermediate tank 705 are consumed. Consequently, in the intermediate tank 705, a fluid volume of the methanol solution decreases while a concentration of the methanol solution drops. By detecting the dropped concentration in the concentration sensor 717, a feed amount (supply amount) of liquid fuel concentrate to the intermediate tank 705 and a collection amount (supply amount) of collected water are determined in the control unit 715. Based on the determined respective feed amounts, the driving time of the fuel pump 711 and the opening position of the three-way valve 706 are controlled so that the above feed amounts of liquid fuel concentrate and water are fed to the intermediate tank 705 to supplement the liquid fuel contained in the intermediate tank 705, while the concentration is maintained in a specified concentration range. In the case where not all the water sent through the water collection pipe line 708 is fed to the intermediate tank 705, remaining water is fed to the liquid concentrate tank 704. Such operation is continuously and repeatedly performed, by which a necessary amount of electricity (specified electricity amount) is continuously generated in the fuel cell body 802. When power generation is stopped in the fuel cell system 801, the air pump 707 is stopped driving and the fuel pump 711 is stopped driving either.

Figure 34:
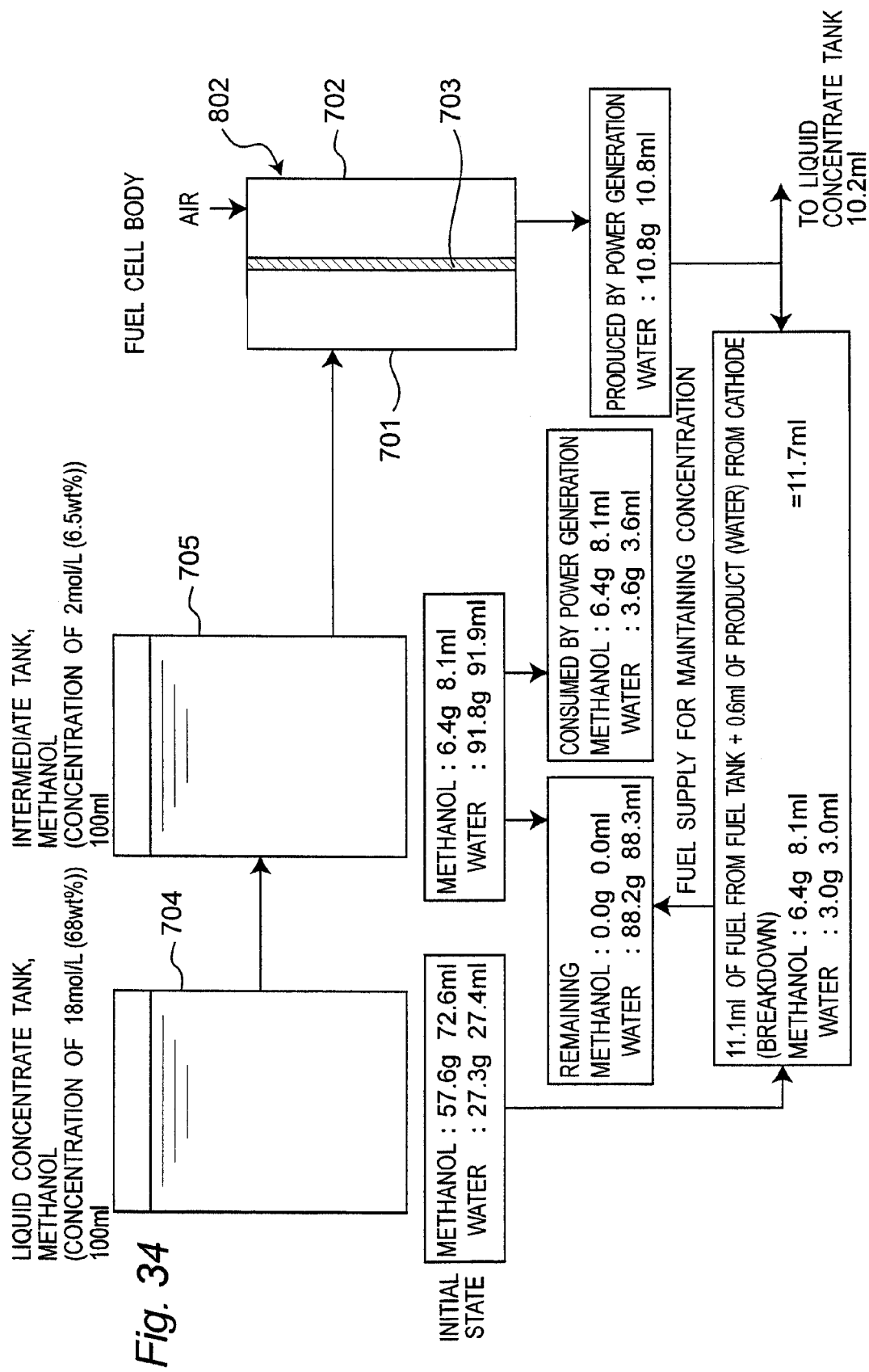
FIG. 34 is an explanatory view showing material balance in a fuel cell system.

Here, an explanatory view showing a specific example of material balance in power generation in the fuel cell system 801 is shown in FIG. 34. It is to be noted that in the membrane electrode assembly 703 in the fuel cell body 802, so-called cross over occurs, i.e., although methanol and water are basically intended to be blocked, methanol and water do pass through the membrane electrode assembly 703. For easier understanding of the material balance described hereinbelow, a description will be made on the assumption that the cross over does not occur in the membrane electrolyte assembly 703.

As shown in FIG. 34, in the fuel cell system 801, 100 ml of methanol solution with a concentration of 68 wt % is contained as the liquid fuel concentrate in the liquid concentrate tank 704, and 100 ml of methanol solution with a concentration of 6.5 wt % is contained as the liquid fuel in the intermediate tank 705.

Upon execution of power generation, if 8.1 ml of methanol and 3.7 ml of water are consumed from the liquid fuel in the anode 701, then 10.8 ml of water is produced in the cathode 702. In this case, in order to reset the concentration and the fluid volume of the methanol solution consumed in the anode 701 and decreased in the intermediate tank 705 to the initial state, 11.1 ml of liquid fuel concentrate from the liquid concentrate tank 704 and 0.6 ml of water produced in the cathode 702 should be supplied to the intermediate tank 705. In this case, by controlling the opening position of the three-way valve 706, 0.6 ml of water and 10.2 ml of water are respectively fed and collected into the intermediate tank 705 and the liquid concentrate tank 704.

As a consequence, the concentration of the liquid fuel concentrate in the liquid concentrate tank 704 after the power generation is decreased by the collection of water to 60 wt %. However, in the intermediate tank 705 after the power generation, the content of the liquid fuel can be returned to 100 ml and the concentration thereof can be maintained at 6.5 wt %. Thus, repeating the power generation, supply of liquid fuel, and collection of produced water gradually decreases the concentration of the liquid fuel concentrate contained in the liquid concentrate tank 704, and with the decrease in the concentration of the supplied liquid fuel concentrate itself, the concentration of the liquid fuel contained in the intermediate tank 705 is also decreased. However, since the destination into which the produced water is collected is determined based on the concentration of the intermediate tank 705, the rate of the concentration decrease in the intermediate tank 705 can be smaller than the rate of the concentration decrease in the liquid concentrate tank 704.

Further, an example of the material balance assuming the ideal case is shown in the explanatory view of the material balance in FIG. 34. During power generation in reality, the temperature of the liquid fuel in the intermediate tank 705 becomes 60° C., that is almost identical to the temperature of the fuel cell body, and therefore when carbon dioxide produced in the reaction in the anode 701 is discharged from the intermediate tank 705, a part of water contained in the liquid fuel is also discharged as water vapor. Therefore, in order to supplement the amount of water discharged from the intermediate tank 705, an amount of the water which is produced in the cathode 702 and fed to the intermediate tank 705 needs to be larger than a calculated amount. Moreover, an amount of water fed to the intermediate tank 705 varies depending on the operation status of the fuel cell.

It is to be understood that the fuel cell body for use in the fuel cell system 801 in the embodiment as described above is not limited to the fuel cell body 802. Instead of using this fuel cell body 802, the fuel cell body with different structures such as the fuel cell body 2 in the first embodiment, the fuel cell concatenated-body 12 in the second embodiment and the fuel cell concatenated-body 212 in the third embodiment is also acceptable.

According to the above-described fourth embodiment, various effects as shown below may be obtained.

First, in the fuel cell system 801, execution of power generation produces water as a product in the cathode 702. Thus-produced water can be all collected into the liquid concentrate tank 704 or the intermediate tank 705, and therefore the water is not discharged. Therefore, the fuel cell system 801 is applicable as the fuel cell system for portable electronic equipment characterized in that the fuel cell system involving water discharge or the like is not adoptable.

Further, if the produced water is not collected only into the intermediate tank 705 but selectively collected into the intermediate tank 705 or the liquid concentrate tank 704 by control of the opening position of the three-way valve 706 based on, for example, the concentration of the liquid fuel contained in the intermediate tank 705, then it becomes possible to supplement the liquid fuel while the concentration of the liquid fuel in the intermediate tank 705 is maintained in the concentration range for effective power generation.

Moreover, collecting the produced water into the intermediate tank 705 or the liquid concentrate tank 704 leads to the concentration decrease of the liquid fuel concentrate or the liquid fuel in the respective tanks. However, selecting the destination into which the water is collected with the three-way valve 706 so that the concentration of the liquid fuel contained in the intermediate tank 705 is in the concentration range allowing the effective power generation makes it possible to make the rate of the concentration decrease in the intermediate tank 705 smaller than the rate of the concentration decrease in the liquid concentrate tank 704.

Therefore, even in the case of collecting all the produced water, the capacity of the intermediate tank 705 and the liquid concentrate tank 704 may be downsized without causing considerable reduction in the concentration of the liquid fuel in the intermediate tank 705.

Further, collection of the produced water is conducted by utilizing the air pump 707 that is for feeding oxygen into the cathode 702 without providing a water pump or the like, which allows simplification of equipment for the collection of water, i.e., simplification of the auxiliary equipment structure. Moreover, such simplification of the auxiliary equipment structure also makes it possible to reduce power consumption by the auxiliary equipment structure in the fuel cell system 801.

Therefore, it becomes possible to implement downsizing of the fuel cell system 801 itself and reduction of self power consumption, which enables the fuel cell system 801, which is small in size and is capable of executing effective power generation, to be applied as a fuel cell system for portable electronic equipment.

Further, the produced water is collected into the intermediate tank 705 or the liquid concentrate tank 704, which makes it possible to prevent the amount of liquid fuel respectively contained in the intermediate tank 705 and the liquid concentrate tank 704 from being decreased even as the number of power generation operations increases. Therefore, even if consumption of the liquid fuel increases, feed of the liquid fuel can be continuously carried out without being affected by the position of the fuel cell system 801. Such effect is considered to be particularly appropriate for a fuel cell system for portable electronic equipment which is required to take various positions.

Fifth Embodiment

Figure 35:
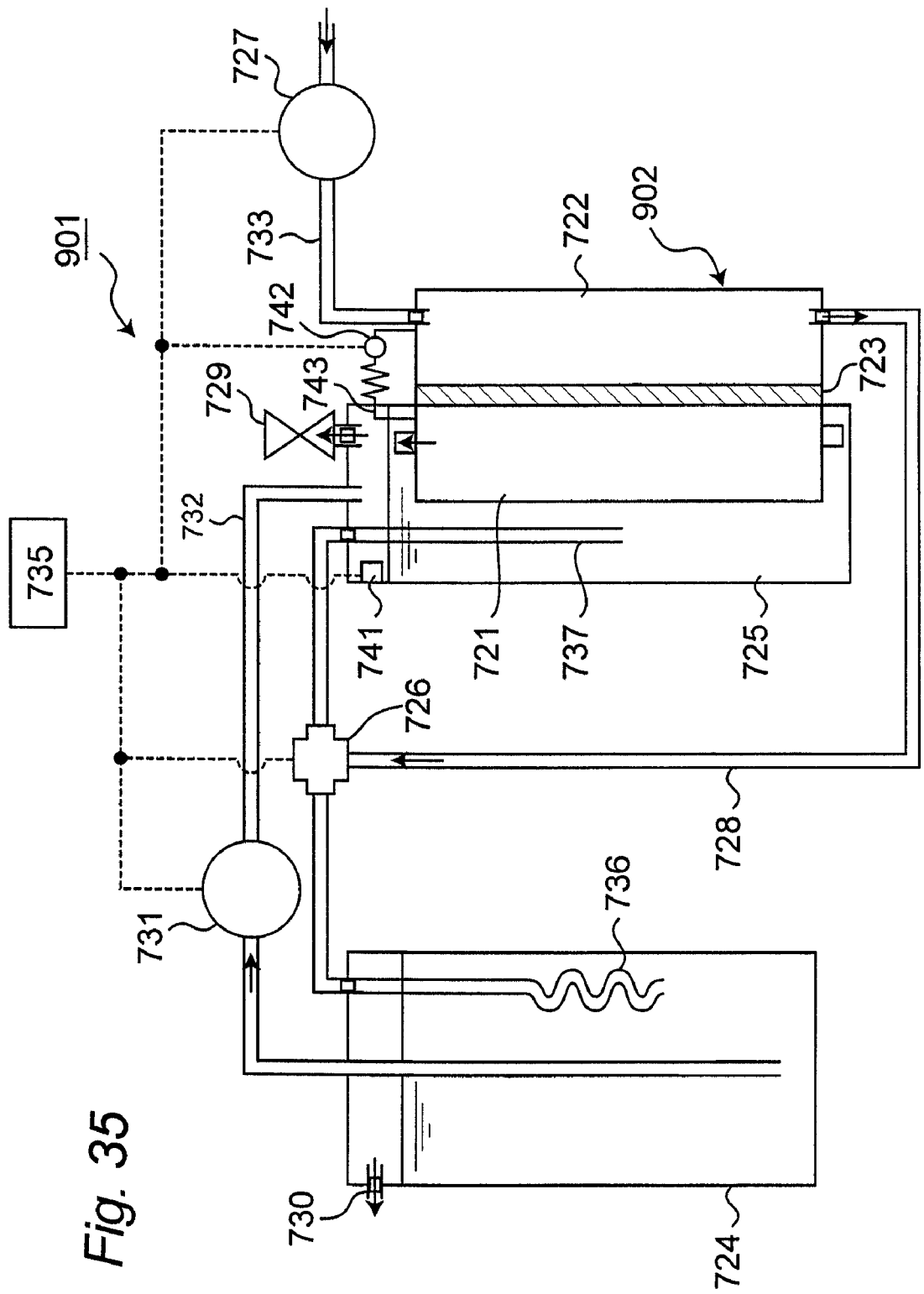
FIG. 35 is a schematic structural view showing a fuel cell system in a fifth embodiment of the present invention.

Next, shown in FIG. 35 is the schematic structural view showing the schematic structure of a fuel cell system 901 according to the fifth embodiment of the present invention. As shown in FIG. 35, the basic structure of the fuel cell system 901 is the same as the fuel cell system 801 in the fourth embodiment except the point that there is provided a fluid volume sensor 741 exemplifying the content detector for detecting a content of the liquid fuel contained in an intermediate tank 725 and the point that the configurations of introducing a water collection pipe line 728 to the intermediate tank 725 and to a liquid concentrate tank 724 are different. The description hereinbelow will be focused on these different structure portions.

As shown in FIG. 35, the fuel cell system 901 has a fuel cell body 902 that has an anode 721, a cathode 722 and a membrane electrode assembly 723. Further, there is provided a power generation circuit 743 that is an external circuit disposed in such manner as to connect the anode 721 and the cathode 722. The power generation circuit 743 is equipped with a watt-hour meter 742 exemplifying the electricity amount detector capable of detecting an amount of generated electricity (or voltage and current).

Further, the fuel cell system 901 is provided with an auxiliary equipment system identical to the fuel cell system 801 in the fourth embodiment, which has an intermediate tank 725, a liquid concentrate tank 724, a fuel pump 731, a liquid concentrate tank 724, a fuel pump 731, an air pump 727, a liquid concentrate feed pipe line 732, a water collection pipe line 728, an air feed pipe line 733 and a three-way valve 726.

As shown in FIG. 35, end portions 736, 737 of the pipe lines extending from the water collection pipe line 728 after branched at the three-way valve 726 are respectively disposed in the vicinity of the almost center of the liquid concentrate tank 724 and the intermediate tank 725 so as to be immersed in the liquid fuel concentrate contained in the liquid concentrate tank 724 and in the liquid fuel contained in the intermediate tank 725. Since water or a mixture of water and air produced in the cathode 702 sometimes have a temperature of, for example, about 60° C. and contain a large amount of water vapor. Such mixture (particularly water vapor) is introduced into the liquid fuel or the liquid fuel concentrate through the respective end portions 736, 737 so as to be reliably collected in the state of being condensed and liquefied. Particularly in the liquid concentrate tank 724 receiving a larger collection amount, the vicinity of the end portion 736 of the water collection pipe line 728 is in a bent shape such as in a helical shape, so that the contact area between the pipe line and the liquid fuel concentrate can be increased to ensure the condensation. Moreover, the liquid concentrate tank 724 is provided with an air discharge port 730 having, for example, a gas-liquid separation membrane for discharging air in the tank. It is to be noted that the air discharge port 730 may be equipped with an exhaust valve.

Further, the fluid volume sensor 741 is capable of detecting a content of the liquid fuel in the intermediate tank 725 and is mainly used for controlling the amounts of the liquid fuel concentrate or water supplied to the intermediate tank 725 so as to prevent overflow in the intermediate tank 725.

Further, as shown in FIG. 35, a control unit 735 for conducting comprehensive control over the fuel cell system 901 is capable of controlling the driving operation of the fuel pump 711 and the air pump 727, and the regulating operation of the opening position of the three-way valve 726. The control unit 735 is further structured to receive inputs of an electricity amount detected by the watt-hour meter 742 and a liquid volume detected by the fluid volume sensor 741.

In thus-structured fuel cell system 901, upon execution of power generation in the fuel cell body 902, the amount of generated electricity is detected by the watt-hour meter 742, and the detection result is loaded into the control unit 735. In the control unit 735, amounts of methanol and water consumed in the anode 721 by the power generation are calculated based on the electricity amount (or voltage and current). Based on the calculated result, a collection amount of water into the intermediate tank 725 and a feed amount of the liquid fuel concentrate are further calculated, according to which regulation of the opening position of the three-way valve 726 and the driving rate of the fuel pump 731 are controlled. Execution of such control makes it possible to maintain the concentration of the liquid fuel contained in the intermediate tank 725 in the concentration range allowing effective power generation, that is, the methanol solution with a concentration of, for example, 1 to 10 wt % may be maintained. Further, when the water or the liquid fuel concentrate are fed to the intermediate tank 725, the fluid volume sensor 741 prevents occurrence of overflow in the intermediate tank 725. Consequently, if the intermediate tank 725 is in a fill up state for example, the three-way valve 726 is switched so that the produced water is fed to the liquid concentrate tank 724.

According to the above-stated fifth embodiment, water discharge is not involved and small-sized and efficient power generation is executable as with the fourth embodiment, so that a fuel cell system particularly suitable for the fuel cell system for portable electronic equipment can be provided.

Further, in conformity to the generated electricity amount, the control unit 735 can calculate amounts of liquid fuel concentrate and water that should be supplied to the intermediate tank 725, which makes it possible to eliminate the necessity of the concentration sensor for detecting the concentration of the liquid fuel in the intermediate tank 725.

Further, the intermediate tank 725 is equipped with the fluid volume sensor 741 capable of detecting the content, which makes it possible to prevent overflow in the intermediate tank 725 or the like from occurring.

Further, the collected water often contains water vapor. Even in such a case, however, the end portions 736, 737 of the water collection pipe line 708 are immersed in the liquid, which makes it possible to reliably collect water vapor after it is condensed and liquefied.

Further, since the control unit 735 can calculate the concentration of the liquid fuel contained in the intermediate tank 725 based on an electricity amount detected during power generation by the watt-hour meter 742 provided in the power generation circuit 743, it becomes possible for the control unit 735 to indicate that replacement of liquid fuel is required once the concentration becomes lower than the concentration range that allows effective power generation.

Although in the fourth embodiment and the fifth embodiment, a description has been given of the cases in which a Nafion 117 (trade name) made by DuPont as an electrolyte is used as the membrane electrode assemblies 703, 723, there may be used in place of the Nafion 117 as materials of the membrane having proton conductivity, sulfonated fluorine-based polymer typified by perfluorocarbon-based sulfonic acid, and hydrocarbon-based polymer materials such as polystyrene sulfonic acid and sulfonated polyether ether ketone groups.

Further, although a description has been given of the case where carbon paper is used as a diffusion layer in the fourth embodiment and the fifth embodiment, there may be used in place of the carbon paper, foam metal (e.g., foam metal made of stainless materials) as a diffusion layer.

Moreover, in the above-described respective embodiments, there is used a methanol solution contained in the intermediate tank 705 with a concentration in the range of 1 wt % to 10 wt %. However, the upper limit of such a concentration range is based on the cross over characteristic of the electrolyte in the fuel cell body. Therefore, if this cross over characteristic will be improved in the future, it becomes possible to use a methanol solution with a higher concentration (i.e., a concentration higher than 10 wt %).

Further, the fuel cell system 801 or 901 in the fourth embodiment or the fifth embodiment may be applied as a cell of notebook-sized personal computers in the form of the fuel cell pack 9 as shown in FIGS. 13A and 13B.

It is to be understood that among the aforementioned various embodiments, arbitrary embodiments may be properly combined so as to achieve the effects possessed by each embodiment.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The disclosure of Japanese Patent Application No. 2003-173395 filed on Jun. 18, 2003 and No. 2003-173409 filed on Jun. 18, 2003 including specification, drawing and claims are incorporated herein by reference in its entirety.

The invention claimed is:

1. A fuel cell, comprising:
a fuel cell body including
an anode having an anode-side separator that is flat in a thickness direction and has projections and depressions formed on a surface of the anode-side separator,
a cathode disposed so as to face the anode and having a cathode-side separator that is made of a nonconductive material, the cathode-side separator being flat in a thickness direction and having projections and depressions formed on a surface of the cathode-side separator, and
a membrane electrode assembly disposed between the anode and the cathode; and
a container for containing liquid fuel which is to be fed to the anode, the container housing at least the anode of the fuel cell body so as to be immersed in the liquid fuel,
wherein the fuel cell body has fuel passageways surrounded by the projections and depressions formed on the surface of the anode-side separator and a surface of the membrane electrode assembly, and
the fuel passageways are connected to a feed port and a discharge port so as to extend in substantially one direction from the feed port to the discharge port, the discharge port being provided at a position higher than that of the feed port.

2. The fuel cell as defined in claim 1, further comprising:
a conductive diffusion layer disposed on a surface of the membrane electrode assembly so as to be in contact with the cathode-side separator and serve as a cathode-side electrode.

3. The fuel cell as defined in claim 1, wherein the fuel passageways are disposed so as to be inclined relative to a direction extending from the feed port to the discharge port.

* * * * *